United States Patent
Faxér et al.

(10) Patent No.: US 11,476,902 B2
(45) Date of Patent: Oct. 18, 2022

(54) MULTI-BEAM CSI REPORTING

(71) Applicant: Telefonaktiebolaget LM Ericsson (publ), Stockholm (SE)

(72) Inventors: Sebastian Faxér, Järfälla (SE); Shiwei Gao, Nepean (CA); Robert Mark Harrison, Grapevine, TX (US); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/111,567

(22) Filed: Dec. 4, 2020

(65) Prior Publication Data

US 2021/0091828 A1  Mar. 25, 2021

Related U.S. Application Data

(63) Continuation of application No. 16/483,839, filed as application No. PCT/IB2017/058320 on Dec. 21, 2017, now Pat. No. 10,903,880.

(Continued)

(51) Int. Cl.
  *H04B 7/02* (2018.01)
  *H04B 7/0417* (2017.01)
  (Continued)

(52) U.S. Cl.
  CPC ......... *H04B 7/0417* (2013.01); *H04B 7/0478* (2013.01); *H04B 7/0486* (2013.01);
  (Continued)

(58) Field of Classification Search
  CPC ... H04B 7/0417; H04B 7/0626; H04B 7/0486
  (Continued)

(56) References Cited

U.S. PATENT DOCUMENTS 10,903,880 B2 *  1/2021  Faxer ............... H04B 7/0486
2012/0039251 A1   2/2012  Sayana et al.
(Continued)

FOREIGN PATENT DOCUMENTS

CN  105144607 A  12/2015
EP  2439859 A1  4/2012
(Continued)

OTHER PUBLICATIONS

Examination Report for Indian Patent Application No. 20197034964, dated Mar. 30, 2021, 7 pages.
(Continued)

*Primary Examiner* — Don N Vo
(74) *Attorney, Agent, or Firm* — Withrow & Terranova, PLLC

(57) ABSTRACT

Systems and methods for multi-beam Channel State Information (CSI) reporting are provided. In some embodiments, a method of operation of a second node connected to a first node in a wireless communication network for reporting multi-beam CSI includes reporting a rank indicator and a beam count indicator in a first transmission to the first node. The method also includes reporting a cophasing indicator in a second transmission to the first node. The cophasing indicator identifies a selected entry of a codebook of cophasing coefficients where the number of bits in the cophasing indicator is identified by at least one of the beam count indicator and the rank indicator. In this way, feedback for both a rank indicator and a beam count indicator may be possible which may allow robust feedback and variably sized cophasing and beam index indicators.

28 Claims, 17 Drawing Sheets

Related U.S. Application Data

(60) Provisional application No. 62/455,440, filed on Feb. 6, 2017.

(51) Int. Cl.
*H04B 7/0456* (2017.01)
*H04B 7/06* (2006.01)

(52) U.S. Cl.
CPC ........... *H04B 7/065* (2013.01); *H04B 7/0626* (2013.01); *H04B 7/0639* (2013.01); *H04B 7/0658* (2013.01)

(58) Field of Classification Search
USPC ........................................................ 375/267
See application file for complete search history.

(56) References Cited

U.S. PATENT DOCUMENTS

| | | |
|---|---|---|
| 2012/0069917 A1 | 3/2012 | Liu et al. |
| 2014/0254701 A1 | 9/2014 | Geirhofer et al. |
| 2015/0312015 A1 | 10/2015 | Chen et al. |
| 2016/0248492 A1 | 8/2016 | Prasad et al. |
| 2016/0337056 A1 | 11/2016 | Frenne et al. |
| 2017/0288751 A1 | 10/2017 | Faxér et al. |
| 2018/0034519 A1 | 2/2018 | Rahman et al. |
| 2018/0034523 A1 | 2/2018 | Kim et al. |
| 2018/0062724 A1 | 3/2018 | Onggosanusi et al. |
| 2018/0076859 A1 | 3/2018 | Faxér et al. |
| 2018/0191411 A1 | 7/2018 | Faxér et al. |
| 2018/0254813 A1 | 9/2018 | Gao et al. |
| 2018/0262246 A1 | 9/2018 | Faxér et al. |
| 2018/0269941 A1 | 9/2018 | Faxér et al. |
| 2018/0294856 A1 | 10/2018 | Faxér et al. |
| 2019/0045460 A1 | 2/2019 | Muruganathan et al. |
| 2019/0053265 A1* | 2/2019 | Kim ..................... H04L 5/0044 |
| 2019/0132032 A1 | 5/2019 | Faxér et al. |
| 2019/0280747 A1 | 9/2019 | Faxer et al. |
| 2019/0341981 A1 | 11/2019 | Park et al. |
| 2020/0007205 A1 | 1/2020 | Park et al. |

FOREIGN PATENT DOCUMENTS

| | | |
|---|---|---|
| JP | 2011530207 A | 12/2011 |
| JP | 2016517192 A | 6/2016 |
| RU | 2538735 C2 | 1/2015 |
| WO | 2011137595 A1 | 11/2011 |
| WO | 2011150559 A1 | 12/2011 |
| WO | 2015084051 A1 | 6/2015 |
| WO | 2016137061 A1 | 9/2016 |
| WO | 2018142204 A1 | 8/2018 |
| WO | 2018142205 A1 | 8/2018 |

OTHER PUBLICATIONS

Examination Report for Indian Patent Application No. 20197034963, dated Mar. 19, 2021, 6 pages.
Author Unknown, "Technical Specification Group Radio Access Network; Evolved Universal Terrestrial Radio Access (E-UTRA); Physical channels and modulation (Release 14)," Technical Specification 36.211, Version 14.1.0, 3GPP Organizational Partners, Dec. 2016, 175 pages.
Author Unknown, "Technical Specification Group Radio Access Network; Evolved Universal Terrestrial Radio Access (E-UTRA); Multiplexing and channel coding (Release 14)," Technical Specification 36.212, Version 14.1.1, 3GPP Organizational Partners, Jan. 2017, 149 pages.
Author Unknown, "Technical Specification Group Radio Access Network; Evolved Universal Terrestrial Radio Access (E-UTRA); Physical layer procedures (Release 14)," Technical Specification 36.213, Version 14.1.0, 3GPP Organizational Partners, Dec. 2016, 414 pages.
Author Unknown, "Technical Specification Group Radio Access Network; Evolved Universal Terrestrial Radio Access (E-UTRA); Medium Access Control (MAC) protocol specification (Release 14)," Technical Specification 36.321, Version 14.1.0, 3GPP Organizational Partners, Dec. 2016, 98 pages.
Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.1.0, 3GPP Organizational Partners, Dec. 2016, 654 pages.
Beijing Xinwei Telecom Techn., "R1-156496: Further Discussion of CSI Report for FD-MIMO," Third Generation Partnership Project, TSG RAN WG1 Meeting #83, Nov. 15-22, 2015, 6 pages, Anaheim, California.
CATT, "R1-1611335: Codebook enhancement for advanced CSI," Third Generation Partnership Project (3GPP), TSG RAN WG1 Meeting #87, Nov. 14-18, 2016, 12 pages, Reno, USA.
Ericsson, "R1-167643: Explicit versus implicit feedback for advanced CSI reporting," Third Generation Partnership Project (3GPP), TSG-RAN WG1#86, Aug. 22-26, 2016, 11 pages, Gothenburg, Sweden.
Ericsson, "R1-1612661: Advanced CSI Codebook Structure," Third Generation Partnership Project (3GPP), TSG-RAN WG1 #87, Nov. 14-18, 2016, 9 pages, Reno, USA.
Samsung, "R1-1612504: Codebook design framework for NR MIMO," Third Generation Partnership Project (3GPP), TSG RAN WG1 #87, Nov. 14-18, 2016, 5 pages, Reno, USA.
Non-Final Office Action for U.S. Appl. No. 16/483,822, dated Dec. 24, 2020, 6 pages.
Non-Final Office Action for U.S. Appl. No. 16/483,839, dated Apr. 16, 2020, 11 pages.
Examination Report No. 1 for Australian Patent Application No. 2017397007, dated May 14, 2020, 5 pages.
Office Action for Moroccan Patent Application No. 46816, dated Dec. 23, 2019, 9 pages.
Intention to Grant for European Patent Application No. 17832360.6, dated Sep. 21, 2020, 5 pages.
Office Action for Egyptian Patent Application No. 2019081235, dated Sep. 20, 2020, 4 pages.
Notice of Reasons for Refusal for Japanese Patent Application No. 2019-542442, dated Nov. 13, 2020, 9 pages.
Search Report for Japanese Patent Application No. 2019-542442, dated Oct. 15, 2020, 74 pages.
Notice of Reasons for Refusal for Japanese Patent Application No. 2019-542463, dated Nov. 13, 2020, 9 pages.
Search Report for Japanese Patent Application No. 2019-542463, dated Oct. 15, 2020, 74 pages.
Notification of Reason for Refusal for Korean Patent Application No. 10-2019-7025840, dated Oct. 19, 2020, 8 pages.
International Search Report and Written Opinion for International Patent Application No. PCT/IB2017/058320, dated Mar. 20, 2018, 18 pages.
Written Opinion for International Patent Application No. PCT/IB2017/058320, dated Jan. 25, 2019, 8 pages.
International Preliminary Report on Patentability for International Patent Application No. PCT/IB2017/058320, dated May 9, 2019, 27 pages.
International Search Report and Written Opinion for International Patent Application No. PCT/IB2017/058321, dated Mar. 20, 2018, 17 pages.
Written Opinion for International Patent Application No. PCT/IB2017/058321, dated Jan. 30, 2019, 5 pages.
International Preliminary Report on Patentability for International Patent Application No. PCT/IB2017/058321, dated May 10, 2019, 11 pages.
Ericsson et al., "R1-1613647: WF on Advanced CSI Codebook," 3GPP TSG RAN WG1, Meeting #87, Nov. 14-18, 2016, Reno, Nevada, 5 pages.
ETRI, "R1-157107: CSI types and reporting modes," 3GPP TSG RAN WG1, Meeting #83, Nov. 15-22, 2015, Anaheim, California, 4 pages.
Samsung, "R1-156793: Discussions on PUCCH based class A CSI reporting for FD-MIMO," 3GPP TSG RAN WG1, Meeting #83, Nov. 15-22, 2015, Anaheim, California, 8 pages.

(56) References Cited

OTHER PUBLICATIONS

Extended European Search Report for European Patent Application No. 21154671.8, dated Jul. 8, 2021, 10 pages.
Examination Report No. 1 for Australian Patent Application No. 2021203019, dated Jun. 3, 2022, 4 pages.
First Office Action for Chinese Patent Application No. 2017800891065, dated May 7, 2022, 12 pages.
First Office Action for Chinese Patent Application No. 2022071502236590, dated Jul. 20, 2022, 21 pages.

* cited by examiner

W1 Beam selection
- $O_1 = O_2 = 4$
  - If $N_2 = 1, O_2 = 1$
- $2N_1 N_2 \in \{4, 8, 12, 16, 20, 24, 28, 32\}$
- The leading (stronger) beam index:
  - $k_1^{(1)} = 0, 1, \ldots, N_1 O_1 - 1$
  - $k_2^{(1)} = 0, 1, \ldots, N_2 O_2 - 1$
- The second (weaker) beam index:
  - $k_1^{(2)} = k_1^{(1)} + O_1 d_1$
  - $k_2^{(2)} = k_2^{(1)} + O_2 d_2$
    - $d_1 \in \{0, \ldots, \min(N_1, L_1) - 1\}$
    - $d_2 \in \{0, \ldots, \min(N_2, L_2) - 1\}$
    - $(d_1, d_2) \neq (0,0)$
    - Where $L_1, L_2$ are defined as:
      - If $N_1 \geq N_2$ and $N_2 \neq 1$
        » $L_1 = 4, L_2 = 2$
      - If $N_1 < N_2$ and $N_1 \neq 1$
        » $L_2 = 4, L_1 = 2$
      - If $N_2 = 1$
        » $L_1 = 8, L_2 = 1$

W1 Beam power
- Second beam power quantized with 2 bits
  - $p_0 = 1, p_1 \in \{1, \sqrt{0.5}, \sqrt{0.25}, 0\}$

W2
- $c_{0,0,0} = c_{0,1,0} = 1$ always
- $c_{r,l,i} \in \{1, j, -1, -j\}, \forall i, r, l$

FIG. 9B

MULTI-BEAM CSI REPORTING

RELATED APPLICATIONS

This application is a continuation of patent application Ser. No. 16/483,839, filed Aug. 6, 2019, now U.S. Pat. No. 10,903,880, issued Jan. 26, 2021, which is a 35 U.S.C. § 371 national phase filing of International Application No. PCT/IB2017/058320, filed Dec. 21, 2017, which claims the benefit of provisional patent application Ser. No. 62/455,440, filed Feb. 6, 2017, the disclosures of which are hereby incorporated herein by reference in their entireties.

TECHNICAL FIELD

The present disclosure relates to multi-beam Channel State Information (CSI) reporting.

BACKGROUND

Because Physical Uplink Control Channel (PUCCH) payloads are constrained, Long Term Evolution (LTE) defines Channel State Information (CSI) reporting types that carry subsets of CSI components (such as Channel Quality Indicators (CQI), Precoding Matrix Indicators (PMI), Rank Indicators (RI), and CSI-RS Resource Indicator (CRI)). Together with the PUCCH reporting mode and 'Mode State', each reporting type defines a payload that can be carried in a given PUCCH transmission, which is given in Third Generation Partnership Project (3GPP) Technical Specification (TS) 36.213, Table 7.2.2-3. In Rel-13, all PUCCH reporting types have payloads that are less than or equal to 11 bits, and so all can be carried in a single PUCCH Format 2 transmission.

SUMMARY

Systems and methods for multi-beam Channel State Information (CSI) reporting are provided. In some embodiments, a method of operation of a second node connected to a first node in a wireless communication network for reporting multi-beam CSI includes reporting a rank indicator and a beam count indicator in a first transmission to the first node. The method also includes reporting a cophasing indicator in a second transmission to the first node. The cophasing indicator identifies a selected entry of a codebook of cophasing coefficients where the number of bits in the cophasing indicator is identified by at least one of the beam count indicator and the rank indicator. In this way, feedback for both a rank indicator and a beam count indicator may be possible which may allow robust feedback and variably sized cophasing and beam index indicators.

In some embodiments, reporting the rank indicator and the beam count indicator in the first transmission includes reporting the rank indicator and the beam count indicator in a first transmission on an uplink control channel. Reporting the cophasing indicator in the second transmission includes reporting the cophasing indicator in the second transmission on the uplink control channel.

In some embodiments, the beam count indicator includes a number of beams and/or an indication of relative powers between the beams, wherein a beam with zero power implicitly indicates an absence of the beam. In some embodiments, the possible values of at least one of the beam count indicator and the cophasing indicator comprise both a zero and a non-zero value.

In some embodiments, the method also includes reporting a beam index in a third transmission to the first node. In some embodiments, the third transmission also includes at least one of a beam rotation and/or a second beam index.

In some embodiments, the method also includes jointly identifying a number of beams and an index of a beam in a multi-beam CSI report. The first transmission and the second transmission include transmitting the multi-beam CSI report to the first node. In some embodiments, jointly identifying the number of beams and indices of the beams in the multi-beam CSI report includes determining a number of beams L used to construct the multi-beam CSI report; and determining a beam indicator for an lth beam, the beam indicator identifying the index of a beam of the multi-beam CSI report if L is at least l, and otherwise identifying that L is less than l.

In some embodiments, the method also includes reporting CSI corresponding to a first number of beams if the CSI corresponds to a first rank; and reporting CSI corresponding to a second number of beams if the CSI corresponds to a second rank. In some embodiments, the first rank is smaller than the second rank and the first number of beams is larger than the second number of beams.

In some embodiments, the method also includes providing an indication of at least one beam index pair index $(l_k,m_k)$ corresponding to a beam $d(k)$.

In some embodiments, beam $d(k)$ comprises a set of complex numbers, each element of the set of complex numbers being characterized by at least one complex phase shift such that: $d_n(k)=d_i(k)\alpha_{i,n}e^{j2\pi(p\Delta_{1,k}+q\Delta_{2,k})}$, $d_n(k)$, and $d_i(k)$ are the $n^{th}$ and $i^{th}$ elements of the beam $d(k)$, respectively, $a_{i,n}$ is a real number corresponding to the $i^{th}$ and $n^{th}$ elements of the beam $d(k)$, p and q are integers, and $\Delta_{1,k}$ and $\Delta_{2,k}$ are real numbers corresponding to beam directions of the two dimensional beam $d(k)$ that determine the complex phase shifts $e^{j2\pi\Delta_{1,k}}$ and $e^{j2\pi\Delta_{2,k}}$ in the first and the second dimension, respectively.

In some embodiments, a method of operation of a first node connected to a second node in a wireless communication network for receiving multi-beam CSI includes receiving a rank indicator and a beam count indicator in a first transmission from the second node; and receiving a cophasing indicator in a second transmission from the second node. The cophasing indicator identifies a selected entry of a codebook of cophasing coefficients wherein the number of bits in the cophasing indicator is identified by at least one of the beam count indicator and the rank indicator.

In some embodiments, receiving the rank indicator and the beam count indicator in the first transmission includes receiving the rank indicator and the beam count indicator in a first transmission on an uplink control channel; and receiving the cophasing indicator in the second transmission includes receiving the cophasing indicator in the second transmission on the uplink control channel.

In some embodiments, the beam count indicator includes at least one of a number of beams and/or an indication of relative powers.

In some embodiments, the possible values of at least one of the beam count indicator, and the cophasing indicator include both a zero and a non-zero value.

In some embodiments, the method also includes receiving a beam index in a third transmission from the second node. In some embodiments, the third transmission also includes at least one of the group consisting of a beam rotation and second beam index.

In some embodiments, the method also includes receiving CSI corresponding to a first number of beams if the CSI corresponds to a first rank; and receiving CSI corresponding to a second number of beams if the CSI corresponds to a second rank. In some embodiments, the first rank is smaller than the second rank and the first number of beams is larger than the second number of beams.

In some embodiments, the method also includes receiving an indication of at least one beam index pair index $(l_k,m_k)$ corresponding to a beam d(k).

In some embodiments, each beam d(k) comprises a set of complex numbers and each element of the set of complex numbers being characterized by at least one complex phase shift such that: $d_n(k)=d_i(k)\alpha_{i,n}e^{j2\pi(p\Delta_{1,k}+q\Delta_{2,k})}$, $d_n(k)$, and $d_i(k)$ are the $n^{th}$ and $i^{th}$ elements of the beam d(k), respectively, $a_{i,n}$ is a real number corresponding to the $i^{th}$ and $n^{th}$ elements of the beam d(k), p and q are integers, and $\Delta_{1,k}$ and $\Delta_{2,k}$ are real numbers corresponding to the beam directions of the two dimensional beam d(k) that determine the complex phase shifts $e^{j2\pi\Delta_{1,k}}$ and $e^{j2\pi\Delta_{2,k}}$ respectively.

In some embodiments, a second node includes at least one processor and memory. The memory includes instructions executable by the at least one processor whereby the second node is operable to report a rank indicator and a beam count indicator in a first transmission to a first node; and report a cophasing indicator in a second transmission to the first node. The cophasing indicator identifying a selected entry of a codebook of cophasing coefficients wherein the number of bits in the cophasing indicator is identified by at least one of the beam count indicator and the rank indicator.

In some embodiments, a second node includes a reporting module operable to report a rank indicator and a beam count indicator in a first transmission to a first node; and report a cophasing indicator in a second transmission to the first node. The cophasing indicator identifying a selected entry of a codebook of cophasing coefficients wherein the number of bits in the cophasing indicator is identified by at least one of the beam count indicator and the rank indicator.

In some embodiments, a first node includes at least one processor and memory. The memory includes instructions executable by the at least one processor whereby the first node is operable to: receive a rank indicator and a beam count indicator in a first transmission from a second node; and receive a cophasing indicator in a second transmission from the second node. The cophasing indicator identifying a selected entry of a codebook of cophasing coefficients wherein the number of bits in the cophasing indicator is identified by at least one of the beam count indicator and the rank indicator.

In some embodiments, a first node includes a receiving module operable to receive a rank indicator and a beam count indicator in a first transmission from a second node; and receive a cophasing indicator in a second transmission from the second node. The cophasing indicator identifying a selected entry of a codebook of cophasing coefficients wherein the number of bits in the cophasing indicator is identified by at least one of the beam count indicator and the rank indicator.

In some embodiments, the first node is a radio access node. In some embodiments, the second node is a wireless device. In some embodiments, the wireless communication network is a Long Term Evolution (LTE) wireless communication network. In some embodiments, the wireless communication network is a New Radio (NR) or Fifth Generation (5G) wireless communication network.

In some embodiments, in Third Generation Partnership Project (3GPP), for advanced CSI reporting in Rel-14, $W_1$, which contains information of the beam indices, is reported with a payload of 13 bits while $W_2$, which contains information of the cophasing coefficients, is reported with a payload of 6 bits for rank=1 or 12 bits for rank=2. This implicitly assumes aperiodic reporting on a Physical Uplink Shared Channel (PUSCH) where the feedback payload is not constrained. For periodic CSI reporting on a Physical Uplink Control Channel (PUCCH), though, Long Term Evolution (LTE) currently only supports CSI feedback on PUCCH Format 2, which has a payload of 11 bits. Neither $W_1$ nor $W_2$ (in the case of rank-2) can be directly reported on a single PUCCH Format 2 transmission since the payload is larger than 11 bits.

Indications of $W_1$ and $W_2$ for the advanced CSI codebook in 3GPP are (at least in some cases) larger than can be supported on PUCCH format 2, so advanced CSI is not yet supported adequately for PUCCH reporting.

Some embodiments disclosed herein relate to:

Subsampling $W_2$ by linking two cophasing vectors (one for each layer) in rank 2 such that the two vectors are orthogonal and using the Quadrature Phase-Shift Keying (QPSK) alphabet for each cophasing coefficient, which results in 4 bits for $W_2$ feedback.

Subsampling $W_2$ by using the same cophasing coefficients for two polarizations with independent cophasing vectors in rank 2 and using the Binary Phase-Shift Keying (BPSK) alphabet for each cophasing coefficient, which results in 4 bits for $W_2$ feedback.

Feeding back both a rank indicator and a beam count indicator in a PUCCH transmission to allow robust feedback, and to allow a variably sized cophasing and beam index indicators to be carried on PUCCH.

Some embodiments relate to constructing a feedback mechanism for reporting rich CSI feedback on small payload channels, such as PUCCH, while still maintaining sufficient CSI accuracy and reliability. In some embodiments, this is accomplished through various mechanisms, including those that report on subsets of codebooks, use variably sized indicators for CSI reporting components, and multiplexing compatible CSI components together. These embodiments allow periodic feedback of advanced CSI on existing PUCCH format 2.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9B illustrates an example for $W_1$ beam selection, $W_1$ beam power, and $W_2$ determination according to some embodiments of the present disclosure;

FIG. 9B illustrates an example for $W_1$ beam selection, $W_1$ beam power, and $W_2$ determination according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that although terminology from 3GPP LTE has been used in this disclosure, this should not be seen as limiting the scope of the disclosure to only the aforementioned system. Other wireless systems, including New Radio (NR) (i.e., Fifth Generation (5G)), Wideband Code-Division Multiple Access (WCDMA), Worldwide Interoperability for Microwave Access (WiMax), Ultra Mobile Broadband (UMB), and Global System for Mobile Communications (GSM), may also benefit from exploiting the ideas covered within this disclosure.

Also note that terminology such as evolved or enhanced NodeB (eNodeB) and User Equipment (UE) should be considered non-limiting and does not imply a certain hierarchical relation between the two; in general "eNodeB" could be considered as device 1 and "UE" device 2, and these two devices communicate with each other over some radio channel. Herein, wireless transmissions in the downlink are discussed in detail, but some embodiments of the disclosure are equally applicable in the uplink.

Figure 1:
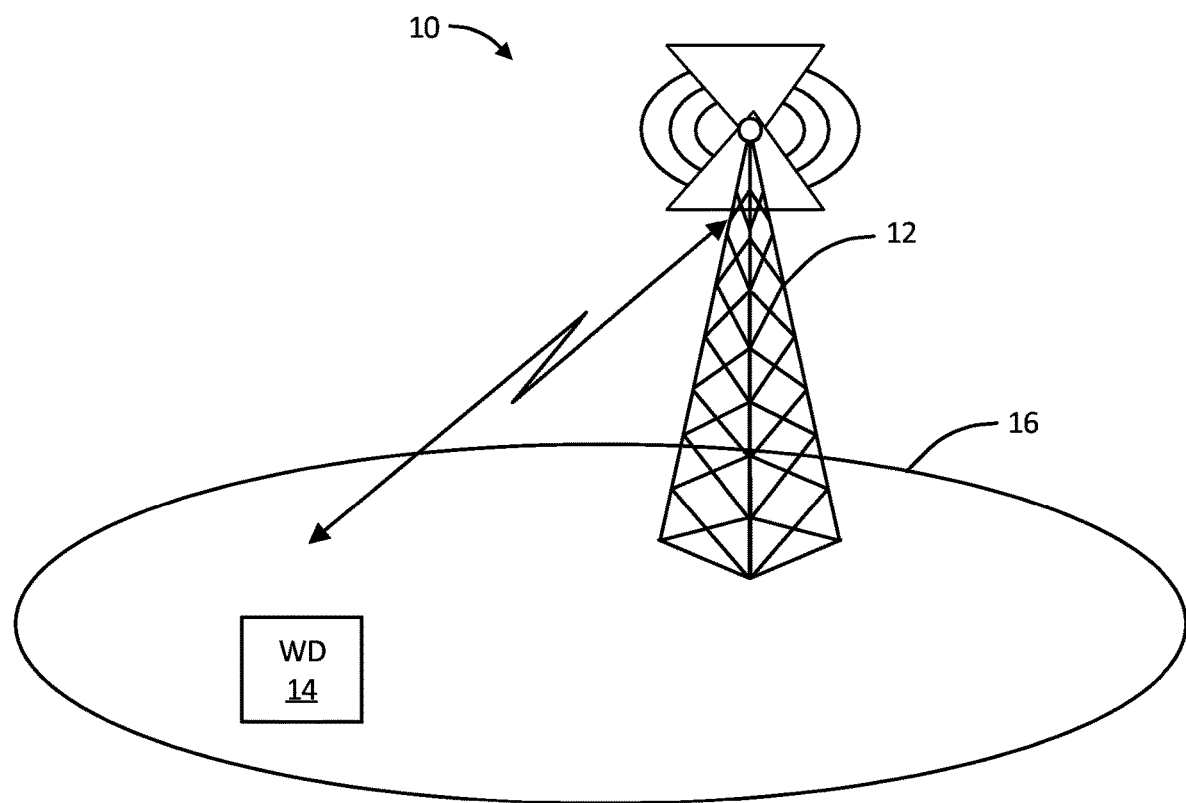
FIG. 1 illustrates a wireless communication system according to some embodiments.

In this regard, FIG. 1 illustrates one example of a wireless system 10 (e.g., a cellular communications system) in which embodiments of the present disclosure may be implemented. The wireless system 10 includes a first node 12, which in this example is a radio access node. However, the first node 12 is not limited to a radio access node and can be another device such as a general radio node allowing communication within a radio network, including a wireless device as described below. The radio access node 12 provides wireless access to other nodes such as wireless devices or other access nodes, such as a second node 14, within a coverage area 16 (e.g., cell) of the radio access node 12. In some embodiments, the second node 14 is a Long Term Evolution User Equipment (LTE UE). Note that the term "UE" is used herein in its broad sense to mean any wireless device. As such, the terms "wireless device" and "UE" are used interchangeably herein.

Figure 2:
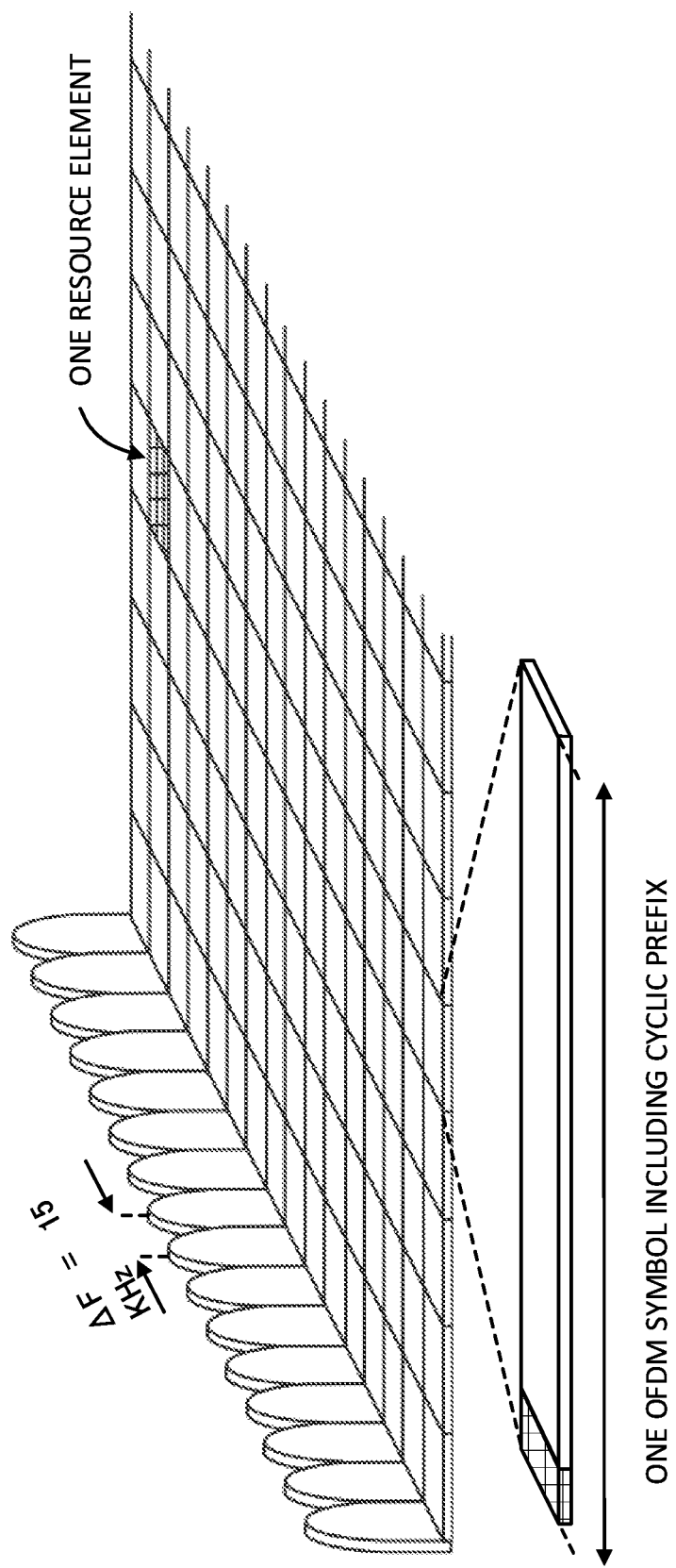
FIG. 2 illustrates a downlink physical resource such as may be used in a Long Term Evolution (LTE) wireless communication system.

LTE uses Orthogonal Frequency-Division Multiplexing (OFDM) in the downlink and Discrete Fourier Transform (DFT)-spread OFDM in the uplink. The basic LTE downlink physical resource can thus be seen as a time-frequency grid as illustrated in FIG. 2, where each resource element corresponds to one OFDM subcarrier during one OFDM symbol interval.

Figure 3:
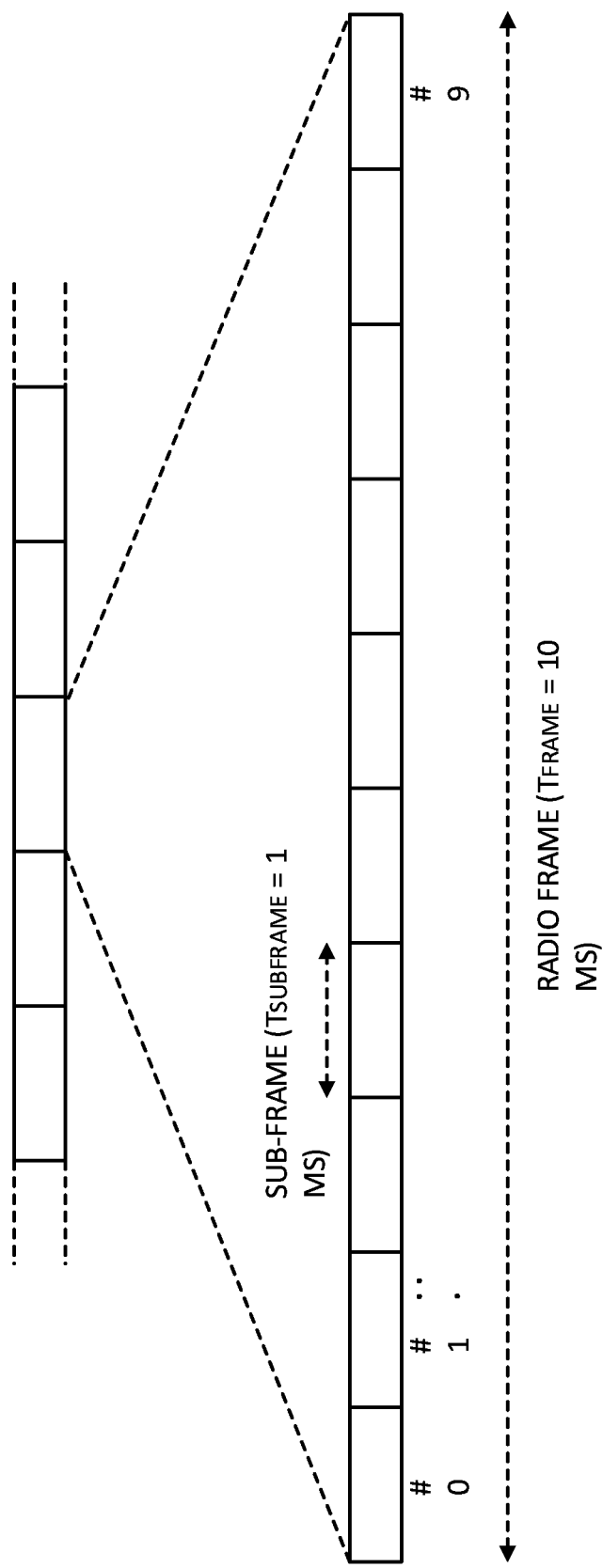
FIG. 3 illustrates a time-domain structure as may be used in the LTE wireless communication system.

FIG. 3 illustrates a time-domain structure as may be used in the LTE wireless communication system. In the time domain, LTE downlink transmissions are organized into radio frames of 10 ms, each radio frame consisting of ten equally-sized subframes of length $T_{subframe}=1$ ms.

Furthermore, the resource allocation in LTE is typically described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

Figure 4:
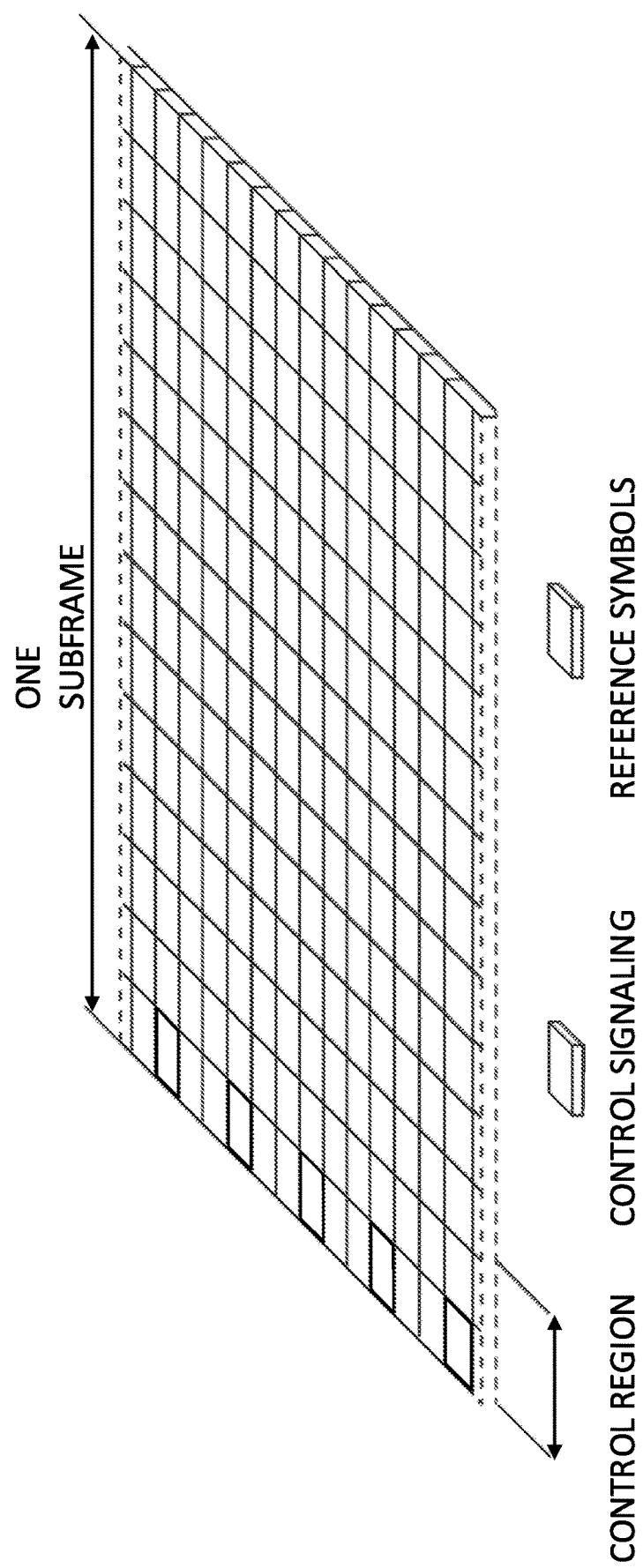
FIG. 4 illustrates a Downlink subframe as may be used in the LTE wireless communication system.

Downlink transmissions are dynamically scheduled; i.e., in each subframe the base station transmits control information regarding to which terminals data is transmitted and upon which resource blocks the data is transmitted in the current downlink subframe. This control signaling is typically transmitted in the first 1, 2, 3 or 4 OFDM symbols in each subframe. A downlink system with 3 OFDM symbols as control is illustrated in FIG. 4.

LTE uses Hybrid Automatic Repeat Requests (HARQ), where after receiving downlink data in a subframe, the terminal attempts to decode it and reports to the base station whether the decoding was successful (ACK) or not (NACK). In case of an unsuccessful decoding attempt, the base station can retransmit the erroneous data.

Uplink control signaling from the terminal to the base station consists of:

HARQ acknowledgements for received downlink data;

terminal reports related to the downlink channel conditions, used as assistance for the downlink scheduling;

scheduling requests, indicating that a mobile terminal needs uplink resources for uplink data transmissions.

Figure 5:
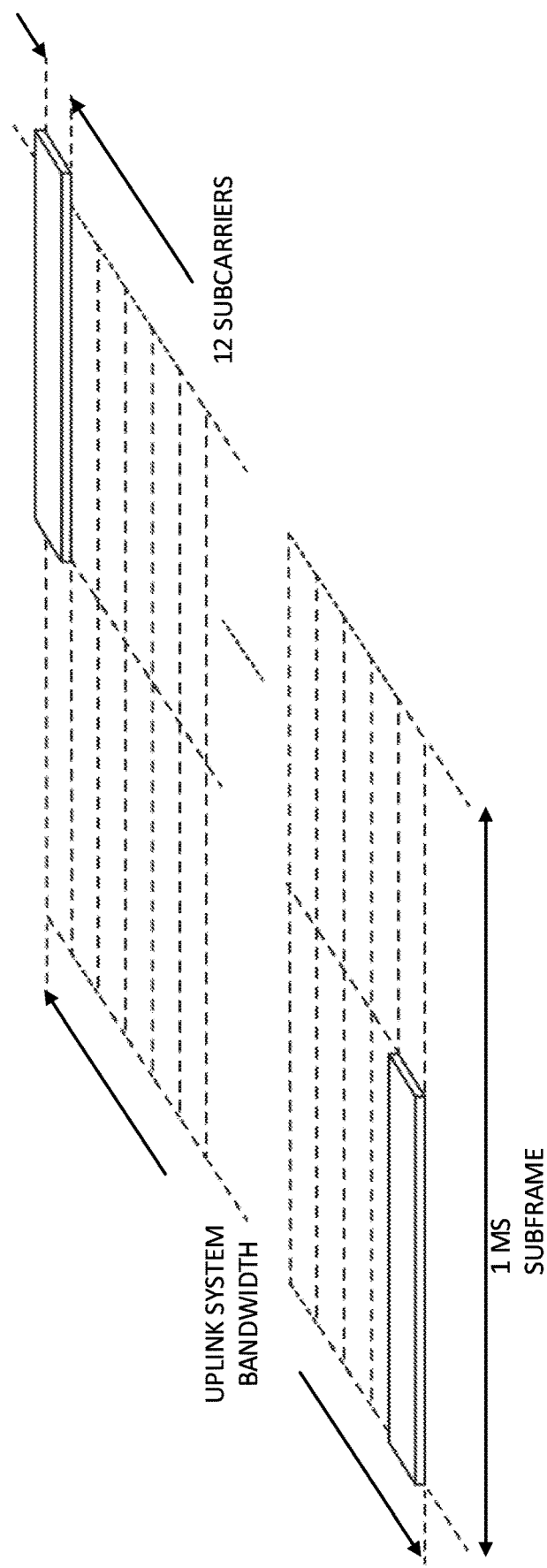
FIG. 5 illustrates uplink L1/L2 control signaling transmission on a Physical Uplink Control Channel (PUCCH), according to some embodiments of the present disclosure.

In order to provide frequency diversity, these frequency resources are frequency hopping on the slot boundary, i.e., one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g., in case of very large overall transmission bandwidth supporting a large number of users, additional resource blocks can be assigned next to the previously assigned resource blocks. FIG. 5 illustrates uplink L1/L2 control signaling transmission on a Physical Uplink Control Channel (PUCCH), As mentioned above, uplink L1/L2 control signaling includes HARQ acknowledgements, channel state information and scheduling requests. Different combinations of these types of messages are possible as described further below, but to explain the structure for these cases it is beneficial to discuss separate transmission of each of the types first, starting with the HARQ and the scheduling request. There are five formats defined for the PUCCH in Rel-13, each capable of carrying a different number of bits. For this background art, PUCCH formats 2 and 3 are the most relevant.

UEs can report channel state information (CSI) to provide the eNodeB with an estimate of the channel properties at the terminal in order to aid channel-dependent scheduling. Such channel properties are those that tend to vary with the fading of the channel or with interference, such as the relative gain and phase of the channel between antenna elements, the signal to interference and noise ratio (SINR) in a given subframe, etc. Such CSI feedback is used to adapt Multiple-Input Multiple-Output (MIMO) precoding and modulation and coding states. LTE provides other measures of channel properties, such as Received Signal Strength Indicators (RSSI), Reference Signal Received Power (RSRP), and Reference Signal Received Quality (RSRQ); however, these are longer term properties not used to adapt MIMO transmission or to select modulation and coding states, and so are not considered CSI in the context of this disclosure.

A CSI report consists of multiple bits per subframe transmitted in the uplink control information (UCI) report. PUCCH Format 1, which is capable of at most two bits of information per subframe, can obviously not be used for this purpose. Transmission of CSI reports on the PUCCH in Rel-13 is instead handled by PUCCH Formats 2, 3, 4, and 5, which are capable of multiple information bits per subframe.

PUCCH Format 2 resources are semi-statically configured. A Format 2 report can carry a payload of at most 11 bits. Variants of Format 2 are Format 2a and 2b which also carry HARQ-ACK information of 1 and 2 bits, respectively for a normal cyclic prefix. For an extended cyclic prefix, PUCCH Format 2 can also carry HARQ-ACK information. For simplicity, they are all referred to as Format 2 herein.

PUCCH format 3 is designed to support larger HARQ-ACK payloads and can carry up to 10 or 20 HARQ-ACK bits for FDD and TDD, respectively. It can also carry Scheduling Requests (SR), and therefore supports up to 21 bits total. PUCCH format 3 can also carry CSI. PUCCH formats 4 and 5 carry still larger payloads.

Because PUCCH payloads are constrained, LTE defines CSI reporting types that carry subsets of CSI components (such as Channel Quality Indicators (CQI), Precoding Matrix Indicators (PMI), Rank Indicators (RI), and CSI-RS Resource Indicators (CRI)). Together with the PUCCH reporting mode and 'Mode State,' each reporting type defines a payload that can be carried in a given PUCCH transmission, which is given in 3GPP TS 36.213, Table 7.2.2-3. In Rel-13, all PUCCH reporting types have payloads that are less than or equal to 11 bits, therefore all can be carried in a single PUCCH Format 2 transmission.

Various CSI reporting types are defined in Rel-13 LTE:

Type 1 report supports CQI feedback for the UE selected subbands

Type 1a report supports subband CQI and second PMI feedback

Type 2, Type 2b, and Type 2c reports support wideband CQI and PMI feedback

Type 2a report supports wideband PMI feedback

Type 3 report supports RI feedback

Type 4 report supports wideband CQI

Type 5 report supports RI and wideband PMI feedback

Type 6 report supports RI and PMI feedback

Type 7 report support CRI and RI feedback

Type 8 report supports CRI, RI and wideband PMI feedback

Type 9 report supports CRI, RI and PMI feedback

Type 10 report supports CRI feedback

These reporting types are transmitted on PUCCH with periodicities and offsets (in units of subframes) determined according to whether CQI, Class A first PMI, RI, or CRI are carried by the reporting type.

Table 1 below shows the subframes when the various reporting types are transmitted assuming that wideband CSI reports are used with a single CSI subframe set. Similar mechanisms are used for subband reporting and for multiple subframe sets.

TABLE 1

| | | |
|---|---|---|
| | | PUCCH Report Transmission Time for CSI Reporting Types |
| CSI content | CSI Reporting Type | Subframe in which wideband CSI reporting type(s) are transmitted |
| CQI | 1, 1a, 2, 2b, 2c, 4 | $(10 \times n_f + \lfloor n_s/2 \rfloor - N_{OFFSET, CQI}) \bmod (N_{pd}) = 0$ |
| Class A first PMI | 2a | $(10 \times n_f + \lfloor n_s/2 \rfloor - N_{OFFSET, CQI}) \bmod (H' \cdot N_{pd}) = 0$ |
| RI | 3, 5 | $(10 \times n_f + \lfloor n_s/2 \rfloor - N_{OFFSET, CQI} - N_{OFFSET,RI}) \bmod (N_{pd} \cdot M_{RI}) = 0$ |
| CRI* | 7, 8, 9, 10 | $(10 \times n_f + \lfloor n_s/2 \rfloor - N_{OFFSET, CQI} - N_{OFFSET,RI}) \bmod (N_{pd} \cdot M_{RI} \cdot M_{CRI}) = 0$ |

Note that CRI is for the case where more than one CSI-RS resource is configured. Where (as defined in 3GPP TSs 36.213 and 36.331):

$n_f$ is the system frame number $n_s$ is the slot number within a radio frame $N_{pd}$ is a periodicity in subframes set by the higher layer parameter cqi-pmi-ConfigIndex $N_{OFFSET,CQI}$ is an offset in subframes set by the higher layer parameter cqi-pmi-ConfigIndex H' is set by the higher layer parameter periodicityFactorWB $M_{RI}$ is periodicity multiple in subframes set by the higher layer parameter ri-ConfigIndex $N_{OFFSET,RI}$ is an offset in subframes set by the higher layer parameter ri-ConfigIndex $M_{CRI}$ is periodicity multiple in subframes set by the higher layer parameter cri-ConfigIndex PUCCH CSI reporting has a fundamental periodicity of $N_{pd}$ subframes, and CQIs can be reported at this rate. If an RI is configured, it can also be reported at the same rate as CQI by configuring $M_{RI}=1$, since an offset $N_{OFFSET,RI}$ can allow the RI to have different subframe shifts of the same periodicity as the CQI. On the other hand, a Class A first PMI is time multiplexed with the CQI, in which the Class A first PMI is transmitted instead of the CQI in one out of H' transmissions of the CQI. The CRI is time multiplexed with the RI in a similar way, i.e., the CRI is transmitted instead of the RI in one out of $M_{CRI}$ transmissions of the RI.

Also, PUCCH Format 3 can carry ACK/NACK and CSI in the same PUCCH transmission, but the CSI must be from only one serving cell. Furthermore, in Rel-13, a UE only transmits CSI on PUCCH Format 3 when transmitting ACK/NACK. If there is no ACK/NACK to be transmitted in a given subframe and CSI is to be transmitted on PUCCH, the UE will use PUCCH Format 2 in that subframe.

LTE control signaling can be carried in a variety of ways, including carrying control information on a Physical Downlink Control Channel (PDCCH), Enhanced Physical Downlink Control Channel (EPDCCH) or PUCCH, embedded in a (PUSCH), in Medium Access Control (MAC) control elements ('MAC CEs'), or in Radio Resource Control (RRC) signaling. Each of these mechanisms is customized to carry a particular kind of control information. As used herein, a control channel may refer to any of these mechanisms. Additionally, a transmission on a control channel may refer to a separate transmission that carries the information or a part of a transmission that carries specific information.

Control information carried on the PDCCH, EPDCCH, PUCCH, or embedded in PUSCH is physical layer related control information, such as Downlink Control Information (DCI), Uplink Control Information (UCI), as described in 3GPP TS 36.211, 36.212, and 36.213. DCI is generally used to instruct the UE to perform some physical layer function, providing the needed information to perform the function. UCI generally provides the network with needed information, such as HARQ-ACK, Scheduling Request (SR), Channel State Information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the Uplink and Downlink Shared Transport Channels (UL-SCH and DL-SCH), as described in 3GPP TS 36.321. Since a MAC header does not have a fixed size, control information in MAC CEs can be sent when it is needed and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded (whereas UCI and DCI cannot be in Rel-13). MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMIs, CQIs, RIs, and CRIs are not carried in MAC CEs in Rel-13.

Dedicated RRC control information is also carried through UL-SCHs and DL-SCHs using Signaling Radio Bearers (SRBs), as discussed in 3GPP TS 36.331. Consequently, it can also carry large control payloads efficiently. However, SRBs are not generally intended for very frequent transmission of large payloads, and need to be available to support less frequent signaling that should be highly reliably transmitted, such as for mobility procedures including handover. Therefore, similar to the MAC, RRC signaling does not carry channel state information related to a fast fading radio channel, such as PMIs, CQIs, RIs, and CRIs in Rel-13. In fact, this kind of CSI is only carried in UCI signaling on PUSCHs or PUCCHs.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. LTE Release 12 supports an 8-layer spatial multiplexing mode for 8 Tx antennas with channel dependent precoding. The spatial multiplexing mode is aimed for high data rates in favorable channel conditions. An illustration of the spatial multiplexing operation is provided in FIG. 6.

Figure 6:
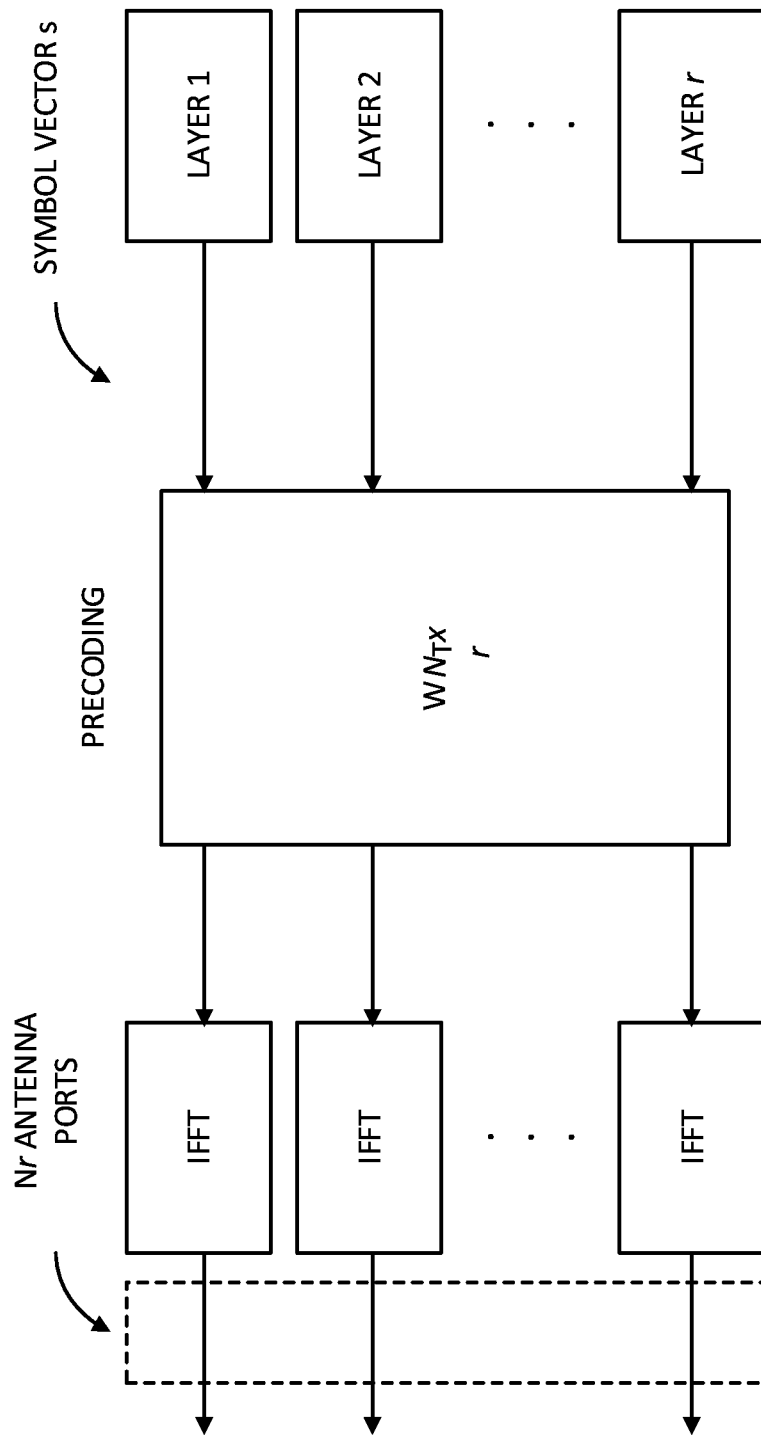
FIG. 6 illustrates a transmission structure of a precoded spatial multiplexing mode as may be used in the LTE wireless communication system according to some embodiments of the present disclosure.

As seen in FIG. 6, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a PMI, which specifies a unique precoder matrix in the codebook for a given number of symbol streams. The r symbols in s each correspond to a layer, and r is referred to as the transmission rank. In this way, spatial multiplexing is achieved, since multiple symbols can be transmitted simultaneously over the same Time/Frequency Resource Element (TFRE). The number of symbols r is typically adapted to suit the current channel properties.

LTE uses OFDM in the downlink (and DFT precoded OFDM in the uplink), and hence the received $N_R \times 1$ vector $y_n$ for a certain TFRE on subcarrier n (or alternatively data TFRE number n) is thus modeled by:

$$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

where $\hat{H}_n$ is a channel estimate, possibly derived from CSI-RS as described below. $W_k$ is a hypothesized precoder matrix with index k. $\hat{H}_n W_k$ is the hypothesized equivalent channel.

Figure 7:
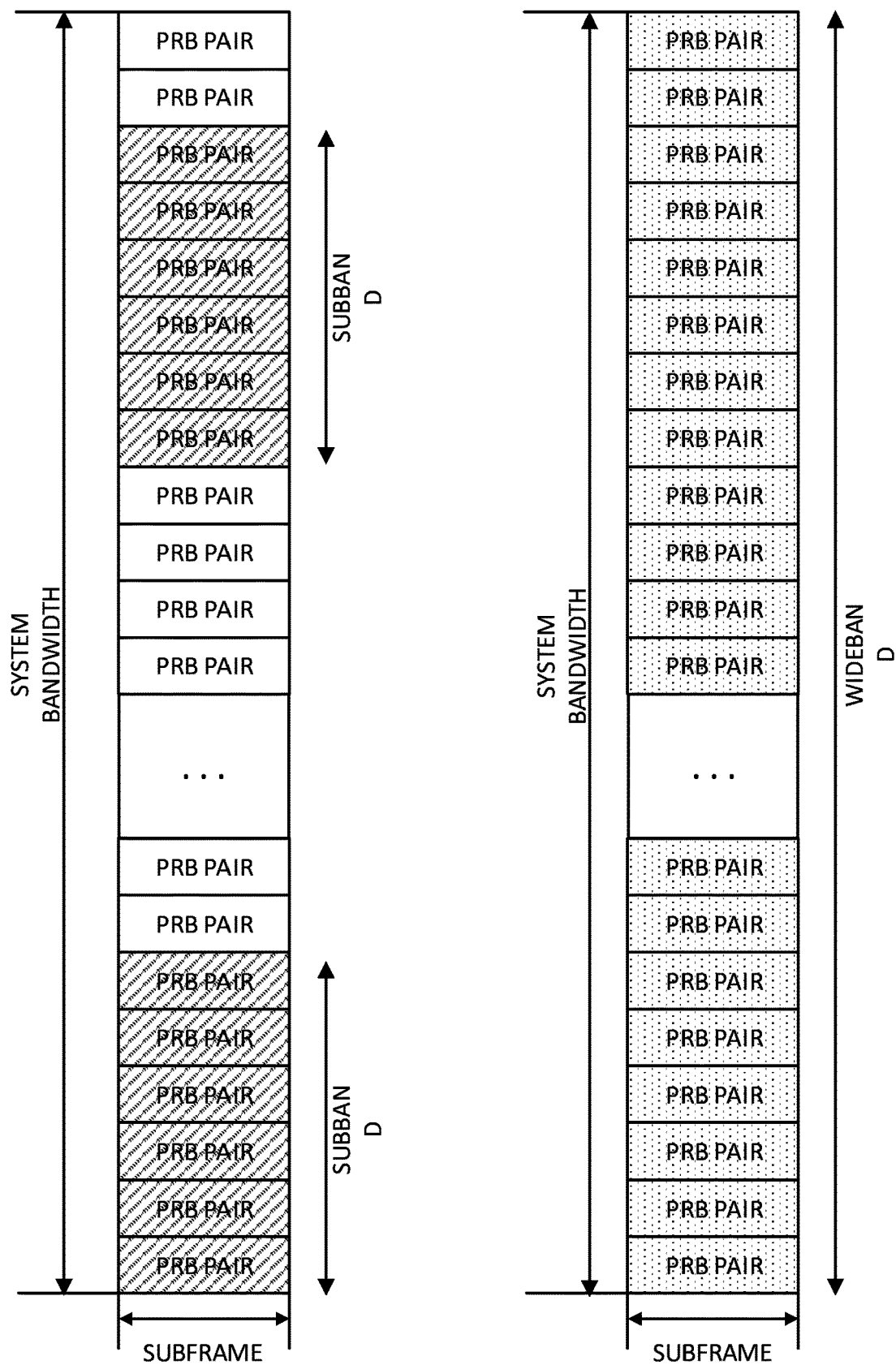
FIG. 7 illustrates an example comparison of a subband and a wideband according to some embodiments of the present disclosure.

With regard to CSI feedback, a subband is defined as a number of adjacent Physical Resource Block (PRB) pairs. In LTE, the subband size (i.e., the number of adjacent PRB pairs) depends on the system bandwidth, whether CSI reporting is configured to be periodic or aperiodic, and feedback type (i.e., whether higher layer configured feedback or UE-selected subband feedback is configured). An example illustrating the difference between subband and wideband is shown in FIG. 7. In the example, the subband consists of 6 adjacent PRBs. Note that only two subbands are shown in FIG. 7 for simplicity of illustration. Generally, all the PRB pairs in the system bandwidth are divided into different subbands where each subband consists of a fixed number of PRB pairs. In contract, wideband involves all the PRB pairs in the system bandwidth. As mentioned above, a UE may feedback a single precoder that takes into account the measurements from all PRB pairs in the system bandwidth if it is configured to report wideband PMI by the eNodeB. Alternatively, if the UE is configured to report subband PMI, a UE may feedback multiple precoders with one precoder per subband. In addition to the subband precoders, the UE may also feedback the wideband PMI.

In closed-loop precoding for the LTE downlink, the UE transmits, based on channel measurements in the forward link (downlink), recommendations to the eNodeB of a suitable precoder to use. The eNB configures the UE to provide feedback according to the UE's transmission mode, and may transmit CSI-RS and configure the UE to use measurements of CSI-RS to feedback recommended precoding matrices that the UE selects from a codebook. A single precoder that is supposed to cover a large bandwidth (wideband precoding) may be fed back. It may also be beneficial to match the frequency variations of the channel and instead feedback a frequency-selective precoding report, e.g. several precoders, one per subband. This is an example of the more general case of channel state information feedback, which also encompasses feeding back other information than recommended precoders to assist the eNodeB in subsequent transmissions to the UE. Such other information may include CQIs as well as transmission RIs.

Given the CSI feedback from the UE, the eNodeB determines the transmission parameters it wishes to use to transmit to the UE, including the precoding matrix, transmission rank, and Modulation and Coding State (MCS). These transmission parameters may differ from the recommendations the UE makes. Therefore, a rank indicator and MCS may be signaled in DCI, and the precoding matrix can be signaled in DCI or the eNodeB can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

In closed loop MIMO transmission schemes such as TM9 and TM10, a UE estimates and feeds the downlink CSI back to the eNodeB. The eNB uses the feedback CSI to transmit downlink data to the UE. The CSI consists of a transmission RI, a PMI and a CQI. A codebook of precoding matrices is used by the UE to find out the best match between the estimated downlink channel $H_n$ and a precoding matrix in the codebook based on certain criteria, for example, the UE throughput. The channel $H_n$ is estimated based on a Non-Zero Power CSI Reference Signal (NZP CSI-RS) transmitted in the downlink for TM9 and TM10.

The CQI/RI/PMI together provide the downlink channel state to the UE. This is also referred to as implicit CSI feedback since the estimation of $H_n$ is not fed back directly. The CQI/RI/PMI can be wideband or subband depending on which reporting mode is configured.

The RI corresponds to a recommended number of streams that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size (i.e., code rate) and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

Codebooks of up to 16 antenna ports have been defined in LTE Up to Release 13. Both one dimension (1D) and two-dimension (2D) antenna arrays are supported. For LTE Release 12 UE and earlier, only a codebook feedback for a 1D port layout is supported, with 2, 4, or 8 antenna ports. Hence, the codebook is designed assuming these ports are arranged on a straight line in one dimension. In LTE Rel-13, codebooks for 2D port layouts were specified for the case of 8, 12, or 16 antenna ports. In addition, a codebook for 1D port layout for the case of 16 antenna ports was also specified in LTE Rel-13.

In LTE Rel-13, two types of CSI reporting were introduced, i.e., Class A and Class B. In Class A CSI reporting, a UE measures and reports CSI based on a new codebook for the configured 2D antenna array with 8, 12 or 16 antenna ports. The Class A codebook is defined by five parameters, i.e. (N1,N2,Q1,Q2,CodebookConfig), where (N1,N2) are the number of antenna ports in a first and a second dimension, respectively. (Q1,Q2) are the DFT oversampling factor for the first and the second dimension, respectively. CodebookConfig ranges from 1 to 4 and defines four different ways the codebook is formed. For CodebookConfig=1, a PMI corresponding to a single 2D beam is fed back for the whole system bandwidth while for CodebookConfig={2,3, 4}, PMIs corresponding to four 2D beams are fed back and each subband may be associated with a different 2D beam. The CSI consists of a RI, a PMI and a CQI or CQIs, similar to the CSI reporting in pre Rel-13.

In Class B CSI reporting, in one scenario (also referred to as "$K_{CSI-RS}>1$"), the eNB may pre-form multiple beams in one antenna dimension. There can be multiple ports (1, 2, 4, or 8 ports) within each beam on the other antenna dimension. "Beamformed" CSI-RS are transmitted along each beam. A UE first selects the best beam from a group of beams configured and then measures CSI within the selected beam based on the legacy pre-Release 13 LTE codebook for 2, 4, or 8 ports. The UE then reports back the selected beam index and the CSI corresponding to the selected beam. In another scenario (also referred to as "$K_{CSI-RS}=1$"), the eNB may form up to 4 (2D) beams on each polarization and "beamformed" CSI-RS is transmitted along each beam. A UE measures CSI on the "beamformed" CSI-RS and feedback CSI based on a new Class B codebook for 2, 4, or 8 ports.

In LTE Release-10, a new reference symbol sequence was introduced for the intent to estimate downlink channel state information, the CSI-RS. The CSI-RS provides several advantages over basing the CSI feedback on the CRS which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring a CSI-RS transmitted from the eNodeB, a UE can estimate the effective channel the CSI-RS is traversing including the radio propagation channel and antenna gains. In more mathematical rigor this implies that if a known CSI-RS signal x is transmitted, a UE can estimate the coupling between the transmitted signal and the received signal (i.e., the effective channel). Hence if no virtualization is performed in the transmission, the received signal y can be expressed as:

$$y=Hx+e \qquad \text{Equation 3}$$

and the UE can estimate the effective channel H.

Up to eight CSI-RS ports can be configured in LTE Rel-10, that is, the UE can estimate the channel from up to eight transmit antenna ports. In LTE Release 13, the number of CSI-RS ports that can be configured is extended to up to sixteen ports (3GPP TS 36.213, 3GPP TS 36.211). In LTE Release 14, supporting up to 32 CSI-RS ports is under consideration.

Related to CSI-RS is the concept of zero-power CSI-RS resources (also known as a muted CSI-RS) that are configured just as regular CSI-RS resources, so that a UE knows that the data transmission is mapped around those resources. The intent of the zero-power CSI-RS resources is to enable the network to mute the transmission on the corresponding resources in order to boost the SINR of a corresponding non-zero power CSI-RS, possibly transmitted in a neighbor cell/transmission point. For Rel-11 of LTE a special zero-power CSI-RS was introduced that a UE is mandated to use for measuring interference plus noise. A UE can assume that the Transmission Points (TPs) of interest are not transmitting on the zero-power CSI-RS resource, and the received power can therefore be used as a measure of the interference plus noise.

Based on a specified CSI-RS resource and on an interference measurement configuration (e.g. a zero-power CSI-RS resource), the UE can estimate the effective channel and noise plus interference, and consequently also determine the rank, precoding matrix, and MCS to recommend to best match the particular channel.

Some embodiments of the current disclosure may be used with two dimensional antenna arrays, and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

Figure 8:
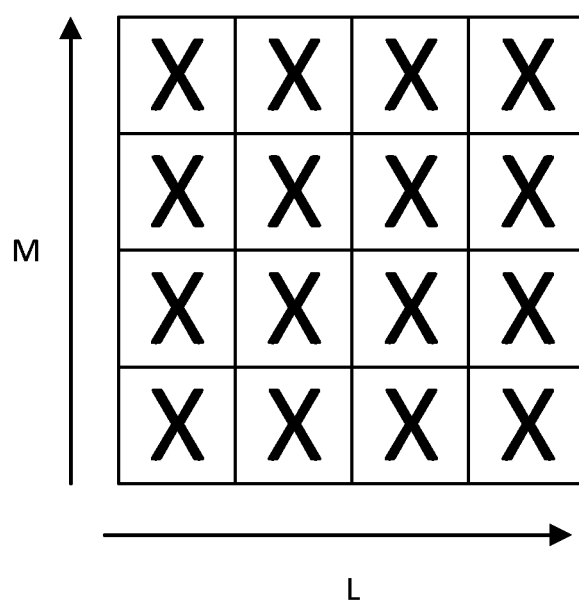
FIG. 8 illustrates an example two-dimensional antenna array according to some embodiments of the present disclosure.

An example of a 4×4 array with cross-polarized antenna elements is illustrated in FIG. 8.

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook. Such 2D codebooks may not strictly relate vertical or horizontal dimensions to the dimensions that antenna ports are associated with. Therefore, 2D codebooks can be considered to have a first and a second number of antenna ports $N_1$ and $N_2$, wherein $N_1$ can correspond to either the horizontal or vertical dimension, and so $N_2$ corresponds to the remaining dimension. That is, if $N_1=N_h$, then $N_2=N_v$, while if $N_1=N_v$, then $N_2=N_h$. Similarly, 2D codebooks may not strictly relate antenna ports to polarization, and be designed with cophasing mechanisms used to combine two beams or two antenna ports, as described in the following.

A common type of precoding is to use a DFT-precoder, where the precoder vector used to precode a single-layer transmission using a single-polarized uniform linear array (ULA) with $N_1$ antennas is defined as:

$$w_{1D}(l, N_1, O_1) = \frac{1}{\sqrt{N_1}} \begin{bmatrix} e^{j2\pi \cdot 0 \cdot \frac{l}{O_1 N_1}} \\ e^{j2\pi \cdot 1 \cdot \frac{l}{O_1 N_1}} \\ \vdots \\ e^{j2\pi \cdot (N_1-1) \cdot \frac{l}{O_1 N_1}} \end{bmatrix} \qquad \text{Equation 4}$$

where $l=0, 1, \ldots, O_1 N_1 -1$ is the precoder index and $O_1$ is an integer oversampling factor. A precoder for a dual-polarized Uniform Linear Array (ULA) with $N_1$ antennas per polarization (and so $2N_1$ antennas in total) can be similarly defined as:

$$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \qquad \text{Equation 5}$$

where $e^{j\phi}$ is a cophasing factor between the two polarizations that may for instance be selected from a QPSK alphabet $\phi \in \{0, \pi/2, \pi, 3\pi/2\}$.

Figure 9A:
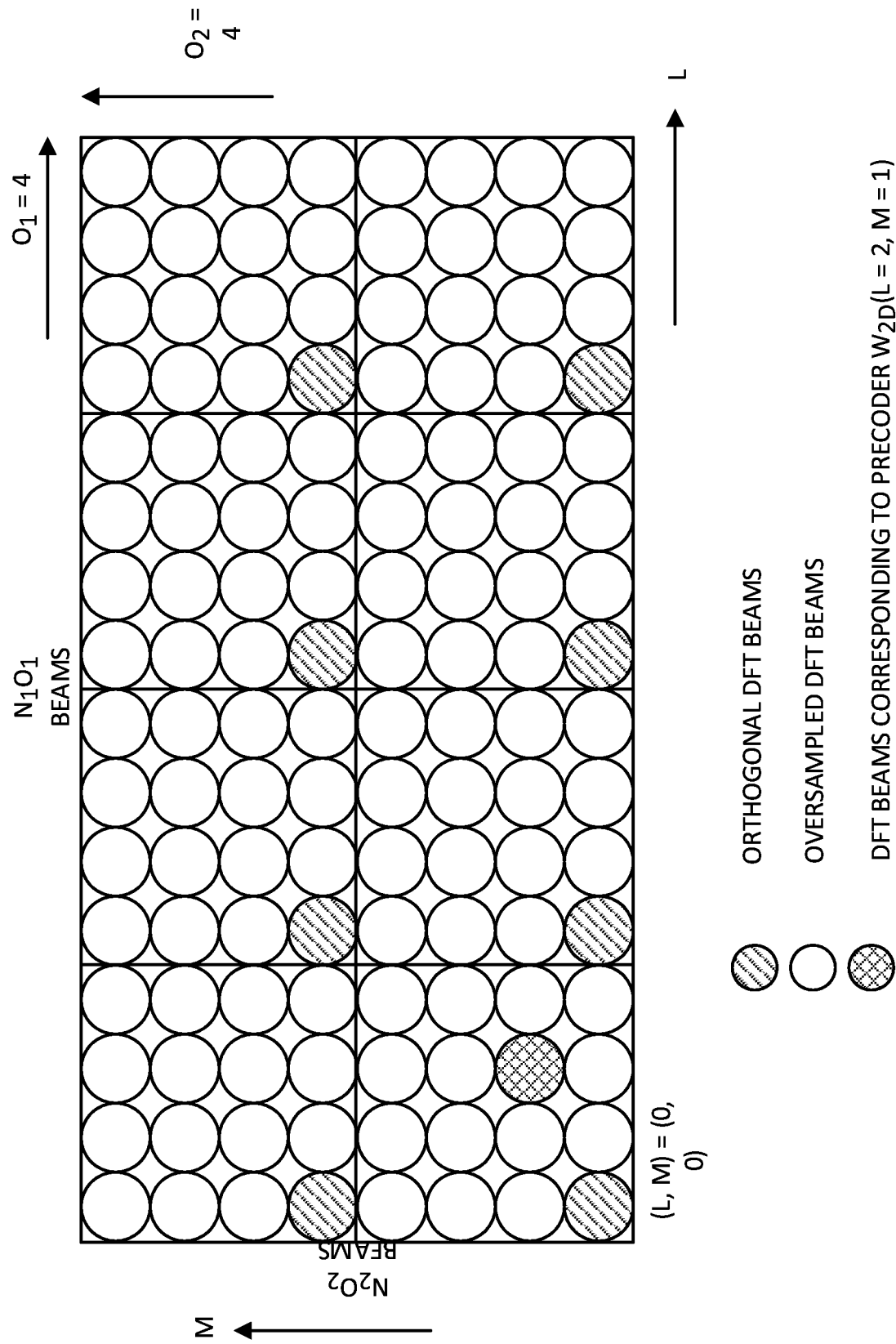
FIG. 9A illustrates an example of oversampled Discrete Fourier Transform (DFT) beams with $(N_1,N_2)=(4,2)$ and $(O_1,O_2)=(4,4)$ according to some embodiments of the present disclosure.

A corresponding precoder vector for a two-dimensional uniform planar array (UPA) with $N_1 \times N_2$ antennas can be created by taking the Kronecker product of two precoder vectors as $w_{2D}(l,m)=w_{1D}(l, N_1, O_1) \otimes w_{1D}(m, N_2, O_2)$, where $O_2$ is an integer oversampling factor in the $N_2$ dimension. Each precoder $w_{2D}(l,m)$ forms a DFT beam; all the precoders $\{w_{2D}(l,m), l=0, \ldots, N_1 O_1 -1; m=0, \ldots, N_2 O_2 -1\}$ form a grid of DFT beams. An example is shown in FIG. 9 where $(N_1, N_2)=(4,2)$ and $(O_1, O_2)=(4,4)$. Throughout the following sections, the terms 'DFT beams' and 'DFT precoders' are used interchangeably.

More generally, a beam with an index pair (l,m) can be identified by the direction in which the greatest energy is transmitted when precoding weights $w_{2D}(l,m)$ are used in the transmission. Also, a magnitude taper can be used with DFT beams to lower the beam's sidelobes. A 1D DFT precoder along $N_1$ and $N_2$ dimensions with magnitude tapering can be expressed as:

$$w_{1D}(l, N_1, O_1, \beta) = \frac{1}{\sqrt{N_1}} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix},$$

-continued $$w_{1D}(m, N_2, O_2, \gamma) = \frac{1}{\sqrt{N_2}} \begin{bmatrix} \gamma_0 e^{j2\pi \cdot 0 \cdot \frac{m}{O_2 N_2}} \\ \gamma_1 e^{j2\pi \cdot 1 \cdot \frac{m}{O_2 N_2}} \\ \vdots \\ \gamma_{N_2-1} e^{j2\pi \cdot (N_2-1) \cdot \frac{m}{O_2 N_2}} \end{bmatrix}$$

where $0 < \beta_i, \gamma_k \leq 1$ ($i=0, 1, \ldots, N_1-1$; $k=0, 1, \ldots, N_2-1$) is an amplitude scaling factor. $\beta_i=1$, $\gamma_k=1$ ($i=0, 1, \ldots, N_1-1$; $k=0, 1, \ldots, N_2-1$) corresponds to no tapering. DFT beams (with or without a magnitude taper) have a linear phase shift between elements along each of the two dimensions. Without loss of generality, it can be assumed that the elements of $w(l,m)$ are ordered according to $w(l,m)=w_{1D}(l, N_1, O_1, \beta) \otimes w_{1D}(m, N_2, O_2, \gamma)$ such that adjacent elements correspond to adjacent antenna elements along dimension $N_2$, and elements of $w(l,m)$ spaced $N_2$ apart correspond to adjacent antenna elements along dimension $N_1$. Then the phase shift between two elements $w_{s_1}(l,m)$ and $w_{s_2}(l,m)$ of $w(l,m)$ can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

where $s_1=i_1 N_2+i_2$ and $s_2=k_1 N_2+k_2$ (with $0 \leq i_2 < N_2$, $0 \leq i_1 < N_1$, $0 \leq k_2 < N_2$, and $0 \leq k_1 < N_1$) are integers identifying two entries of the beam $w(l,m)$ so that $(i_1,i_2)$ indicates to a first entry of beam $w(l,m)$ that is mapped to a first antenna element (or port) and $(k_1,k_2)$ indicates to a second entry of beam $w(l,m)$ that is mapped to a second antenna element (or port).

$\alpha_{s_1}=\beta_{i_1}\gamma_{i_2}$ and $\alpha_{s_2}=\beta_{k_1}\gamma_{k_2}$ are real numbers. $\alpha_i \neq 1$ ($i=s_1, s_2$) if magnitude tapering is used; otherwise $\alpha_i=1$.

$$\Delta_1 = \frac{l}{O_1 N_1}$$

is a phase shin corresponding to a direction along an axis, e.g. the horizontal axis ('azimuth').

$$\Delta_2 = \frac{m}{O_2 N_2}$$

is a phase shift corresponding to direction along an axis, e.g. the vertical axis ('elevation').

Therefore a $k^{th}$ beam $d(k)$ formed with precoder $w(l_k, m_k)$ can also be referred to by the corresponding precoder $w(l_k, m_k)$, i.e. $d(k)=w(l_k, m_k)$. Thus a beam $d(k)$ can be described as a set of complex numbers, each element of the set being characterized by at least one complex phase shift such that an element of the beam is related to any other element of the beam where $d_n(k)=d_i(k)\alpha_{i,n}e^{j2\pi(p\Delta_{1,k}+q\Delta_{2,k})}=d_i(k)\alpha_{i,n}(e^{j2\pi\Delta_{1,k}})^p(e^{j2\pi\Delta_{2,k}})^q$, where $d_i(k)$ is the $i^{th}$ element of a beam $d(k)$, $\alpha_{i,n}$ is a real number corresponding to the $i^{th}$ and $n^{th}$ elements of the beam $d(k)$; p and q are integers; and $\Delta_{1,k}$ and $\Delta_{2,k}$ are real numbers corresponding to a beam with index pair $(l_k, m_k)$ that determine the complex phase shifts $e^{j2\pi\Delta_{1,k}}$ and $e^{j2\pi\Delta_{2,k}}$, respectively. Index pair $(l_k, m_k)$ corresponds to a direction of arrival or departure of a plane wave when beam $d(k)$ is used for transmission or reception in a UPA or ULA. A beam $d(k)$ can be identified with a single index k where $=l_k+N_1 O_1 m_k$, i.e. along vertical or $N_2$ dimension first, or alternatively $k=N_2 O_2 l_k+m_k$, i.e. along horizontal or $N_1$ dimension first.

Extending the precoder for a dual-polarized ULA may then be done as:

$$W_{2D,DP}(l, m, \phi) = \begin{bmatrix} 1 \\ e^{j\phi} \end{bmatrix} \otimes W_{2D}(l, m) = \quad \text{Equation 6}$$

$$\begin{bmatrix} W_{2D}(l, m) \\ e^{j\phi} W_{2D}(l, m) \end{bmatrix} = \begin{bmatrix} W_{2D}(l, m) & 0 \\ 0 & W_{2D}(l, m) \end{bmatrix} \begin{bmatrix} 1 \\ e^{j\phi} \end{bmatrix}$$

A precoder matrix $W_{2D,DP}$ for multi-layer transmission may be created by appending columns of DFT precoder vectors as:

$$W_{2D,DP}^{(R)} = [w_{2D,DP}(l_1, m_1, \phi_1) \ldots w_{2D,DP}(l_2, m_2, \phi_2) \ldots w_{2D,DP}(l_R, m_R, \phi_R)]$$

where R is the number of transmission layers, i.e. the transmission rank. In a special case for a rank-2 DFT precoder, $m_1=m_2=m$ and $l_1=l_2=l$, we have:

$$W_{2D,DP}^{(2)}(l, m, \phi_1, \phi_2) = [W_{2D,DP}(l, m, \phi_1) \; W_{2D,DP}(l, m, \phi_2)] = \quad \text{Equation 7}$$

$$\begin{bmatrix} W_{2D}(l, m) & 0 \\ 0 & W_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A UE can first determine the rank of the estimated downlink wideband channel based on CSI-RS. After the rank is identified, for each subband the UE then searches through all the precoder candidates in a codebook for the determined rank to find the best precoder for the subband. For example, in case of rank=1, the UE would search through $w_{2D,DP}(k,l,\phi)$ for all the possible $(k,l,\phi)$ values. In case of rank=2, the UE would search through $W_{2D,DP}^{(2)}(k,l,\phi_1,\phi_2)$ for all the possible $(k,l,\phi_1,\phi_2)$ values.

With multi-user MIMO (MU-MIMO), two or more users in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased. This, however, comes at the cost of reducing the SINR per stream, as the power has to be shared between streams and the streams will cause interference to each-other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate nullforming between coscheduled users. In the current LTE Rel. 13 standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper nullforming, which may lead to a large amount of interference between co-scheduled users, reducing the benefit of MU-MIMO.

The DFT-based precoders discussed above and used in LTE Rel-13 calculate cophasing across pairs of (typically differently polarized) ports. If more than one beam d(k) is used in CSI reporting, beams are not combined with the cophasing, but port pairs associated with a selected beam are cophased. Consequently, such DFT-based precoders can be considered as 'single beam' precoders. Multi-beam precoders are therefore an extension, where cophasing is applied across beams as well as port pairs. Herein, we describe one such codebook. While the multi-beam codebook is described with two dimensions of the codebook relating to horizontal and vertical dimensions for concreteness, the codebook is equally applicable to a general case where the first or second dimension relates to horizontal or vertical antenna ports, as described above.

$D_N$ is defined as a size N×N DFT matrix, i.e., the elements of $D_N$ are defined as $$[D_N]_{k,l} = \frac{1}{\sqrt{N}} e^{j\frac{2\pi k(l+q)}{N}} \cdot R_N(q) = \text{diag}\left(\left[ e^{j2\pi \cdot 0 \cdot \frac{q}{N}} \quad e^{j2\pi \cdot 1 \cdot \frac{q}{N}} \quad \cdots \quad e^{j2\pi \cdot (N-1) \cdot \frac{q}{N}} \right]\right)$$

is further defined to be a size N×N rotation matrix, defined for $0 \le q < 1$. Multiplying $D_N$ with $R_N(q)$ from the left creates a rotated DFT matrix with entries $$[R_N(q)D_N]_{k,l} = \frac{1}{\sqrt{N}} e^{j\frac{2\pi k(l+q)}{N}}.$$

The rotated DFT matrix $R_N(q)D_N = [d_1 \; d_2 \; \ldots \; d_N]$ consists of normalized orthogonal column vectors $\{d_i\}_{i=1}^N$ which furthermore span the vector space $\mathbb{C}^N$. That is, the columns of $R_N(q)D_N$, for any q, is an orthonormal basis of $\mathbb{C}^N$.

In some embodiments, a codebook design is created by extending the (rotated) DFT matrices that were appropriate transforms for a single-polarized ULA as discussed above to also fit the more general case of dual-polarized 2D UPAs.

A rotated 2D DFT matrix is defined as $D_{N_V,N_H}(q_V,q_H) = (R_{N_H}(q_H)D_{N_H}) \otimes (R_{N_V}(q_V)D_{N_V}) = [d_1 \; d_2 \; \ldots \; d_{N_{DP}}]$. The columns $\{d_i\}_{i=1}^{N_{DP}}$ of $D_{N_V,N_H}(q_V,q_H)$ constitutes an orthonormal basis of the vector space $\mathbb{C}^{N_V N_H}$. Such a column $d_i$ is henceforth denoted a (DFT) beam.

A dual-polarized beam space transformation matrix suitable for a UPA is created where the upper left and lower right elements correspond to the two polarizations:

$$B_{N_V,N_H}(q_V,q_H) =$$

$$I_2 \otimes D_{N_V,N_H}(q_V,q_H) = \begin{bmatrix} D_{N_V,N_H}(q_V,q_H) & 0 \\ 0 & D_{N_V,N_H}(q_V,q_H) \end{bmatrix} =$$

$$\begin{bmatrix} d_1 & d_2 & \cdots & d_{N_V N_H} & 0 & 0 & \cdots & 0 \\ 0 & 0 & \cdots & 0 & d_1 & d_2 & \cdots & d_{N_V N_H} \end{bmatrix} =$$

$$[b_1 \; b_2 \; \cdots \; b_{2N_V N_H}].$$

The columns $\{b_i\}_{i=1}^{2N_V N_H}$ of $B_{N_V,N_H}(q_V,q_H)$ constitute an orthonormal basis of the vector space $\mathbb{C}^{2N_V N_H}$. Such a column b, is henceforth denoted as a single-polarized beam (SP-beam) as it is constructed by a beam d transmitted on a single polarization $$\left(\text{i.e. } b = \begin{bmatrix} d \\ 0 \end{bmatrix} \text{ or } b = \begin{bmatrix} 0 \\ d \end{bmatrix}\right).$$

The notation dual-polarized beam is also introduced to refer to a beam transmitted on both polarizations (which are combined with a polarization cophasing factor $e^{j\alpha}$, i.e.

$$b_{DP} = \begin{bmatrix} d \\ e^{j\alpha} d \end{bmatrix}\bigg).$$

Utilizing the assumption that the channel is somewhat sparse, much of the channel energy is captured by only selecting a column subset of $B_{N_V,N_H}(q_V,q_H)$ that is, it is sufficient to describe a couple of the SP-beams, which keeps down the feedback overhead. Therefore, selecting a column subset $I_S$ consisting of $N_{SP}$ columns of $B_{N_V,N_H}(q_V,q_H)$, creates a reduced beam space transformation matrix $B_{I_S} = [b_{I_S(1)} \; b_{I_S(2)} \; \ldots \; b_{I_S(N_{SP})}]$, eg., selecting column numbers $I_S = [1 \; 5 \; 10 \; 25]$ creates the reduced beam space transformation matrix $B_{I_S} = [b_1 \; b_5 \; b_{10} \; b_{25}]$.

A general precoder structure for precoding of a single layer is:

$$w = B_{I_S} \begin{bmatrix} c_1 \\ c_2 \\ \vdots \\ c_{N_{SP}} \end{bmatrix} = [b_{I_S(1)} \; b_{I_S(2)} \; \cdots \; b_{I_S(N_{SP})}] \begin{bmatrix} c_1 \\ c_2 \\ \vdots \\ c_{N_{SP}} \end{bmatrix} = \sum_{i=1}^{N_{SP}} c_i b_{I_S(i)}.$$

where $\{c_i\}_{i=1}^{N_{SP}}$ are complex beam cophasing coefficients.

The precoder w in the equation above can be described as a linear combination of beams constructed by cophasing a $k^{th}$ beam $b_k$ with cophasing coefficient $c_k$. Such a beam cophasing coefficient is a scalar complex number that adjusts at least the phase of a beam relative to other beams according to $c_k b_k$. When a beam cophasing coefficient only adjusts relative phase, it is a unit magnitude complex number. It is in general desirable to also adjust the relative gain of beams, in which case the beam cophasing coefficient is not unit magnitude.

A more refined multi-beam precoder structure is achieved by separating the complex coefficients in a power (or amplitude) and a phase part as:

$$w = B_{I_S} \begin{bmatrix} c_1 \\ c_2 \\ \vdots \\ c_{N_{SP}} \end{bmatrix} = B_{I_S} \begin{bmatrix} \sqrt{p_1} e^{j\alpha_1} \\ \sqrt{p_2} e^{j\alpha_2} \\ \vdots \\ \sqrt{p_{N_{SP}}} e^{j\alpha_{N_{SP}}} \end{bmatrix} =$$

$$B_{I_S} \begin{bmatrix} \sqrt{p_1} & 0 & & \ddots \\ 0 & \sqrt{p_2} & & \\ & & \ddots & 0 \\ \ddots & & 0 & \sqrt{p_{N_{SP}}} \end{bmatrix} \begin{bmatrix} e^{j\alpha_1} \\ e^{j\alpha_2} \\ \vdots \\ e^{j\alpha_{N_{SP}}} \end{bmatrix} = B_{I_S} \sqrt{P} \begin{bmatrix} e^{j\alpha_1} \\ e^{j\alpha_2} \\ \vdots \\ e^{j\alpha_{N_{SP}}} \end{bmatrix}$$

As multiplying the precoder vector w with a complex constant C does not change its beamforming properties (as only the phase and amplitude relative to the other single-polarized beams is of importance), one may without loss of generality assume that the coefficients corresponding to e.g. SP-beam 1 is fixed to $p_1=1$ and $e^{j\alpha_1}=1$, so that parameters for one less beam needs to be signaled from the UE to the base station. Furthermore, the precoder may be further assumed to be multiplied with a normalization factor, so that, e.g., a sum power constraint is fulfilled, i.e. that $\|w\|^2=1$. Any such normalization factor is omitted from the equations herein for clarity.

In some cases, the possible choices of columns of $B_{N_V,N_H}$ ($q_V,q_H$) are restricted so that if column $i=i_0$ is chosen, so is column $i=i_0+N_V N_H$. That is, if an SP-beam corresponding to a certain beam mapped to the first polarization is chosen, e.g.

$$b_{i_0} = \begin{bmatrix} d_{i_0} \\ 0 \end{bmatrix},$$

this would imply that the SP-beam $$b_{i_0+N_V N_H} = \begin{bmatrix} 0 \\ d_{i_0} \end{bmatrix}$$

is chosen as well. That is, the SP-beam corresponding to the said certain beam mapped to the second polarization is chosen as well. This would reduce the feedback overhead as only $N_{DP}=N_{SP}/2$ columns of $B_{N_V,N_H}$ ($q_V,q_H$) would have to be selected and signaled back to the base station. In other words, the column selection is done on a beam (or DP-beam) level rather than an SP-beam level. If a certain beam is strong on one of the polarizations it would typically imply that the beam would be strong on the other polarization as well, at least in a wideband sense, so the loss of restricting the column selection in this way would not significantly decrease the performance. In the following discussion, the use of DP-beams is generally assumed (unless stated otherwise).

In some cases, the multi-beam precoder is factorized into two or more factors that are selected with different frequency-granularity, in order to reduce the feedback overhead. In such cases, the SP-beam selection (i.e. the choice of matrix $B_{I_s}$) and the relative SP-beam powers/amplitudes (i.e. the choice of matrix $\sqrt{P}$) are selected with a certain frequency-granularity while the SP-beam phases (i.e. the choice of matrix $$\begin{bmatrix} e^{j\alpha_1} \\ e^{j\alpha_2} \\ \vdots \\ e^{j\alpha_{N_{SP}}} \end{bmatrix})$$

are selected with another certain frequency-granularity. In one such case, the certain frequency-granularity corresponds to a wideband selection (that is, one selection for the entire bandwidth) while the said another certain frequency-granularity corresponds to a per-subband selection (that is, the carrier bandwidth is split into a number of subbands, typically consisting of 1-10 PRBs, and a separate selection is done for each subband).

In a typical case, the multi-beam precoder vector is factorized as $w=W_1 W_2$, where $W_1$ is selected with a certain frequency-granularity and $W_2$ is selected another certain frequency-granularity. The precoder vector may then be expressed as $$w = \underbrace{B_{I_s}\sqrt{P}}_{=W_1} \cdot \underbrace{\begin{bmatrix} e^{j\alpha_1} \\ e^{j\alpha_2} \\ \vdots \\ e^{j\alpha_{N_{SP}}} \end{bmatrix}}_{=W_2} = W_1 W_2.$$

Using this notation, if the said certain frequency-granularity corresponds to a wideband selection of $W_1$ and the said another certain frequency-granularity corresponds to a per-subband selection of $W_2$, the precoder vector for subband l may be expressed as $w_1=W_1 W_2(l)$. That is, only $W_2$ is a function of the subband index l.

What needs to be fed back by the UE to the eNodeB is thus:

the chosen columns of $B_{N_V,N_H}$ ($q_V,q_H$), i.e., the $N_{SP}$ single-polarized beams. This requires at most $N_{SP} \cdot \log_2(2N_V N_H)$ bits.

the vertical and horizontal DFT basis rotation factors $q_V$ and $q_H$. For instance, the $$q(i) = \frac{i}{Q},$$

$i=0, 1, \ldots, Q-1$, for some value of Q. The corresponding overhead would then be $2 \cdot \log_2 Q$ bits.

the (relative) power levels $\{p_2, p_3, \ldots, p_{N_{SP}}\}$ of the SP-beams. If L is the number of possible discrete power levels, $(N_{SP}-1) \cdot \log_2 L$ is needed to feedback the SP-beam power levels.

the cophasing factors $\{e^{j\alpha_2}, e^{j\alpha_3}, e^{j\alpha_{NSP}}\}$ of the SP-beams. For instance, $$\alpha(k) = \frac{2\pi k}{K},$$

$k=0, 1, \ldots K-1$, for some value of K. The corresponding overhead would be, $(2N_{DP}-1) \cdot \log_2 K$ bits per rank per $W_2(l)$ report.

Recently, 3GPP has agreed to the following working assumption used to develop physical layer specifications for Rel-14 advanced CSI based on multi-beam precoders. Note that the term 'beam combining coefficient' is used for the cophasing factors $c_{r,l,i}$ here, although the cophasing factors can combine elements with different polarizations as well as different beams.

Precoders are to be normalized in the equations below. FIG. 9B illustrates an example for $W_1$ beam selection, $W_1$ beam power, and $W_2$ determination according to some embodiments of the present disclosure.

$$W_1 = \begin{bmatrix} B & 0 \\ 0 & B \end{bmatrix}, B = \begin{bmatrix} p_0 b_{k_1^{(0)}, k_2^{(0)}}, \ldots, p_{L-1} b_{k_1^{(L-1)}, k_2^{(L-1)}} \end{bmatrix}$$

For rank 1: $W = \begin{bmatrix} \tilde{w}_{0,0} \\ \tilde{w}_{1,1} \end{bmatrix} = W_1 W_2$, and $W_2 = \begin{bmatrix} c_{0,0} \\ c_{1,0} \end{bmatrix}$ For rank 2: $W = \begin{bmatrix} \tilde{w}_{0,0} & \tilde{w}_{0,1} \\ \tilde{w}_{1,0} & \tilde{w}_{1,1} \end{bmatrix} = W_1 W_2$, and $$W_2 = \begin{bmatrix} c_{0,0} & c_{0,1} \\ c_{1,0} & c_{1,1} \end{bmatrix}$$

$c_{r,l} = [c_{r,l,0}, \ldots, c_{r,l,L-1}]^T, r = 0, 1, l = 0, 1$ $\tilde{w}_{r,l} = \sum_{i=0}^{L-1} b_{k_1^{(1)}, k_2^{(1)}} \cdot p_i \cdot c_{r,l,i}; r = 0, 1, l = 0, 1$ L=2 is the number of beams
$b_{k_1, k_2}$ is a 2D DFT beam from oversampled grid
 $k_1 = 0, 1, \ldots N_1 O_1 - 1$
 $k_2 = 0, 1, \ldots N_2 O_2 - 1$
$0 \leq p_i \leq 1$ beam power scaling factor for beam i
$c_{r,l,i}$ beam combining coefficient for beam i and on polarization rand layer l
$W_1$ overhead for $N_1 = N_2 = 4$

| Rank | W1 (bits) | W2 (bits) |
|---|---|---|
| 1 | 13 | 6 |
| 2 | 13 | 12 |

Indicate leading beam: $\lceil \log_2(N_1 N_2 O_1 O_2) \rceil = \lceil \log_2(16 N_1 N_2) \rceil = 8$ bits Indicate second beam:

$\left\lceil \binom{7}{1} \right\rceil = 3$ bits

Relative power of weaker beam: 2 bits

Feedback on PUSCH is supported and feedback on PUCCH is supported. Because feedback on PUCCH is to be supported, and since indications of $W_1$ and $W_2$ are (at least in some cases) larger than can be supported on PUCCH Format 2, the feedback for $W_1$ and/or $W_2$ must be modified when reporting on PUCCH Format 2 is configured.

FIGS. 10A through 13A illustrate procedures for reporting CSI feedback on a physical channel according to some embodiments of the present disclosure.

Figure 10A:
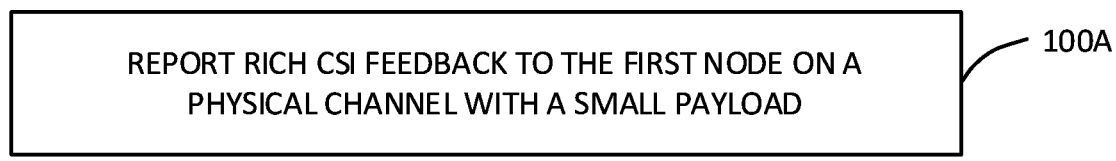
FIGS. 10A, 11A, 12A, and 13A illustrate procedures for reporting CSI feedback on a physical channel according to some embodiments of the present disclosure.

FIG. 10A illustrates a procedure by which the second node 14 reports CSI feedback to the first node 12 on a physical channel (step 100A).

Figure 11A:
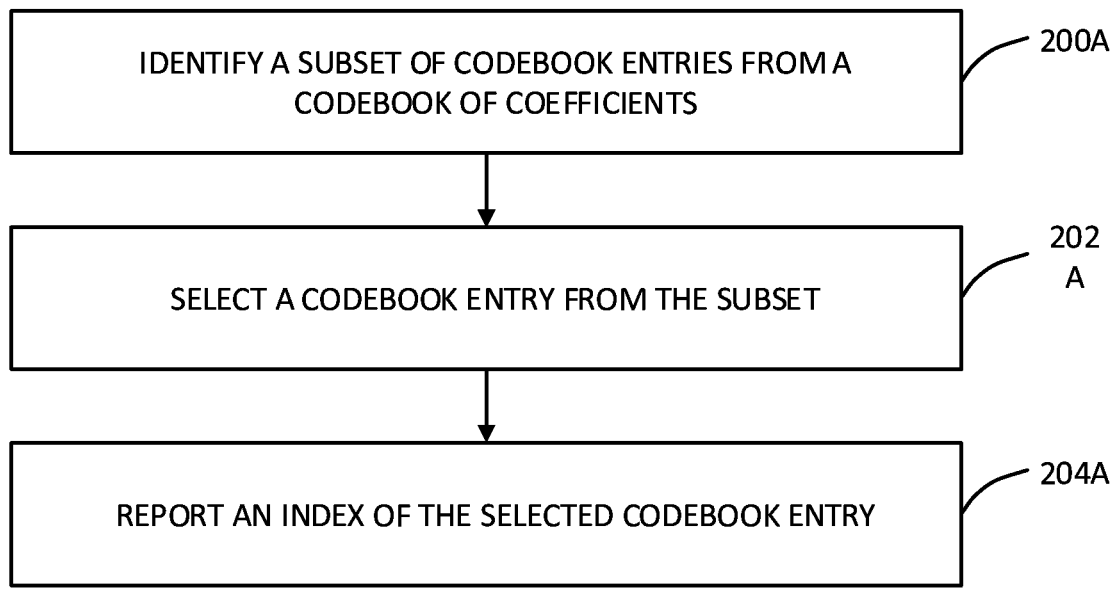
Figure 10B:
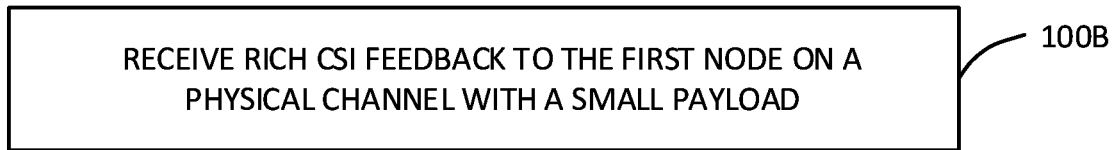
FIGS. 10B, 11B, 12B, and 13B illustrate procedures for receiving CSI feedback on a physical channel according to some embodiments of the present disclosure.
Figure 11B:
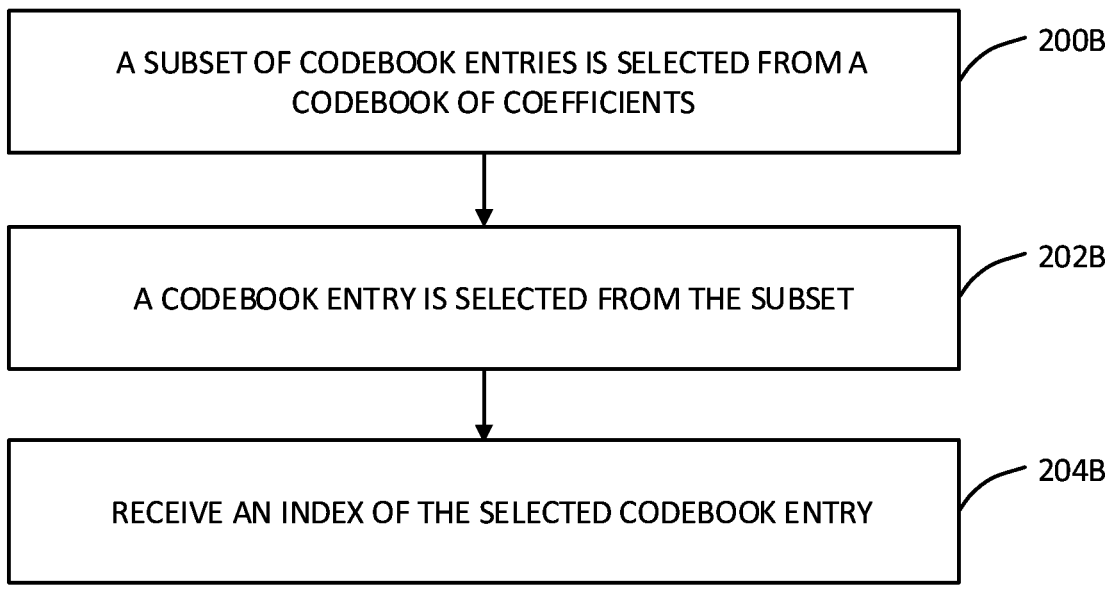

According to some embodiments, the CSI feedback is rich CSI feedback. As used herein, rich CSI refers to CSI that conveys more information than traditional CSI. For example, rich CSI may be a CSI for LTE Advanced or for NR Type 2. Additional examples and description are included below. According to some embodiments, the reporting of CSI feedback is with a small payload. Also, as used herein, a small payload is a payload that includes less total bits than what would usually need to be sent in other applications. For example, an application for advanced CSI is to transmit subband PMI, using a number of bits per subband (considered substantial). Compared to this application, according to some disclosed embodiments, the payload is constrained when there is a need to transmit wideband PMI and further subsample the PMI so that it fits the feedback channel. In such case, a small payload is a payload small enough to fit the feedback channel or smaller. This may be accomplished in many different ways, some of which are discussed below. Specifically, as shown in FIG. 11A, the second node 14 identifies a subset of codebook entries from an advanced CSI codebook of coefficients (step 200A). Then, the second node 14 selects a codebook entry from the subset (202A). An index of the selected codebook entry is reported to the first node 12 (step 204A). In this way, the constraints of the physical channel with the small payload are met, even when sending rich CSI.

Figure 12A:
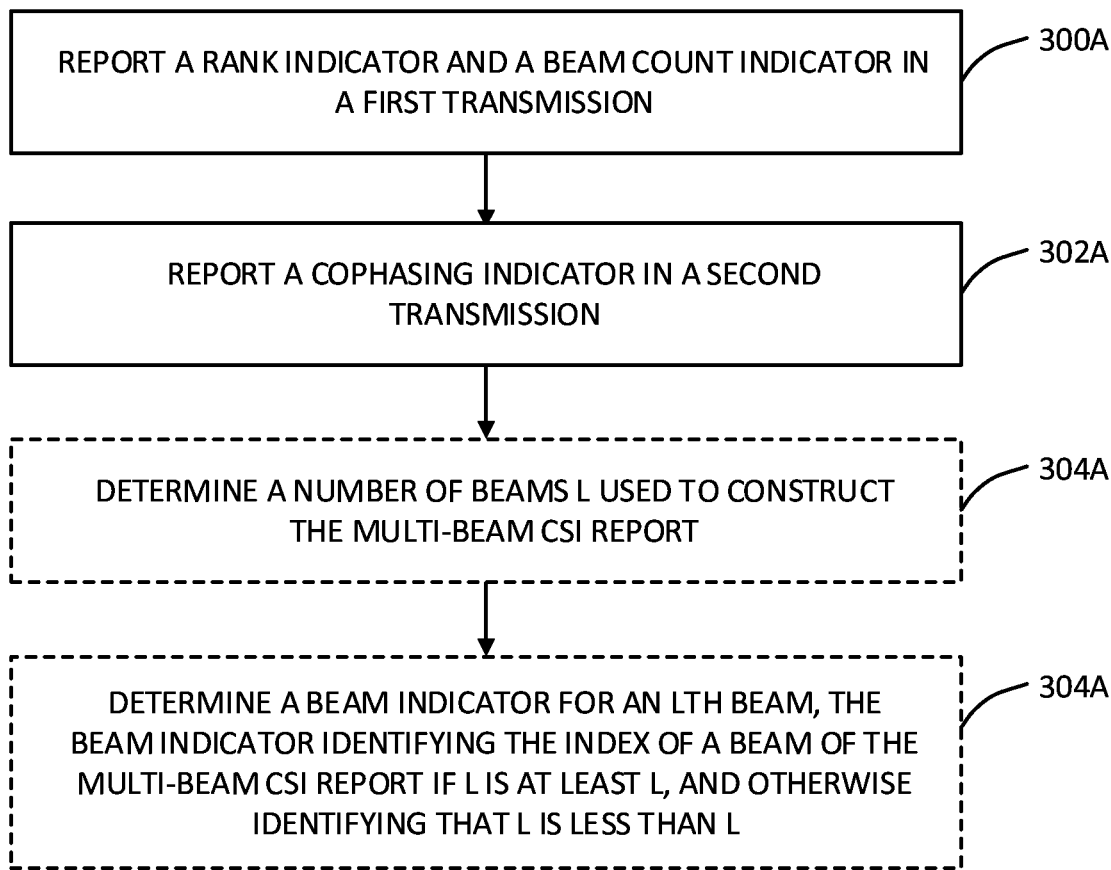

FIG. 12A illustrates a procedure by which the second node 14 reports a rank indicator and a beam count indicator in a first transmission (step 300A) and reports a cophasing indicator in a second transmission (step 302A). In some embodiments, both of these transmissions are sent on the same uplink control channel. In some embodiments, these transmissions are sent on a channel that is acting as a control channel. In some embodiments, the second node 14 determines a number of beams L used to construct the multi-beam CSI report (step 304A). The second node 14 then determines a beam indicator for an $I^{th}$ beam, the beam indicator identifying the index of a beam of the multi-beam CSI report if L is at least I, and otherwise identifying that L is less than I (step 306A).

Figure 13A:
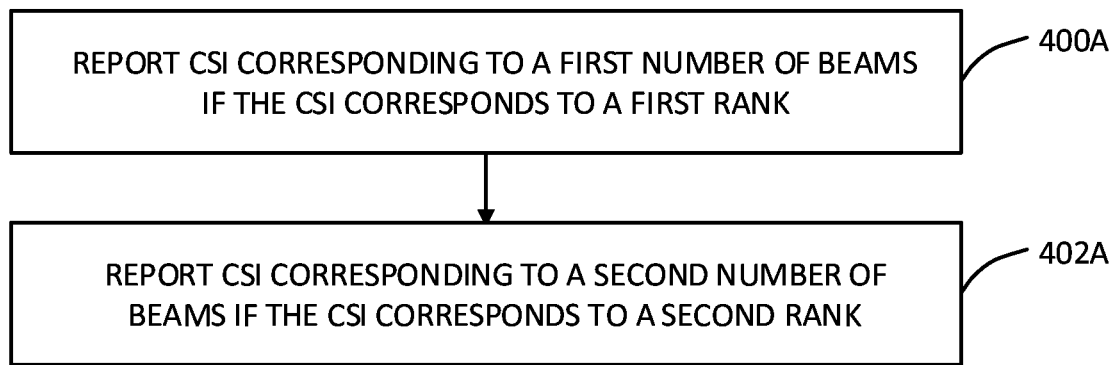
Figure 12B:
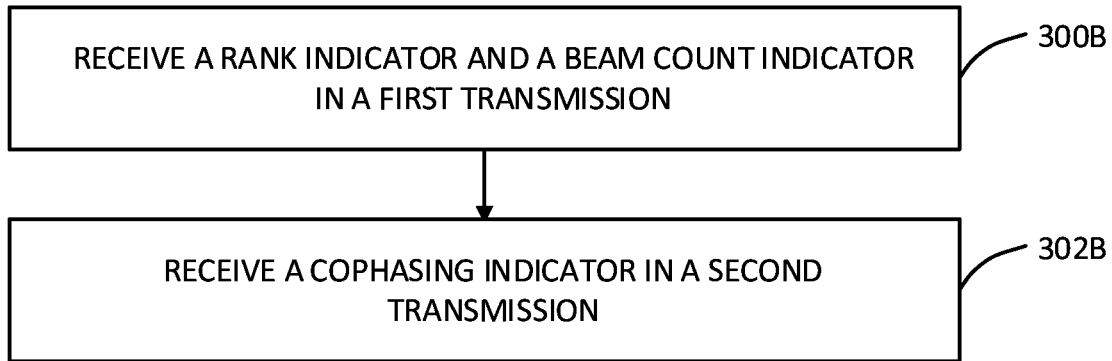
Figure 13B:
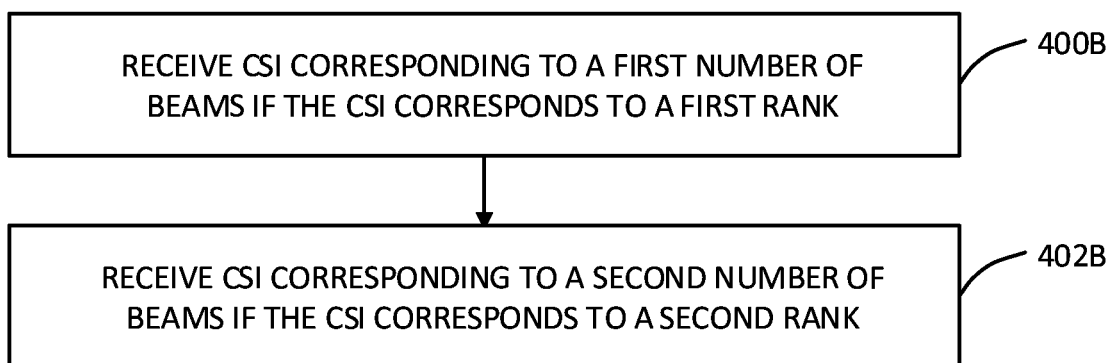

FIG. 13A illustrates a procedure by which the second node 14 reports CSI corresponding to a first number of beams if the CSI corresponds to a first rank (step 400A) and reports CSI corresponding to a second number of beams if the CSI corresponds to a second rank (step 402A).

FIGS. 10B-13B, are figures illustrating analogous operation at a receiving side such as first node 12.

In LTE Rel-13 Class A codebook based periodic CSI feedback is carried on PUCCH Format 2 over at least three transmissions, i.e.
 $1^{st}$ transmission: RI
 $2^{nd}$ transmission: $W_1$
 $3^{rd}$ transmission: $W_2$ and CQI For each transmission, up to 11 bits can be transmitted. A primary aim is to have also three transmissions for advanced CSI feedback over PUCCH Format 2.

As it is possible to multiplex periodic CSI feedback over several PUCCH transmissions, the individual components comprising the PMI feedback indicating the selection of $W_1$ and $W_2$ are reiterated.

The reporting of $W_1$ can be split up into separate components, as was further elaborated in the background:
 leading beams selection: $\log_2(N_V \cdot N_H) = 4$ bits, in the worst case of $2 N_V N_H = 32$ antenna ports
 beam rotations: $\log_2(Q_H \cdot Q_V) = \log_2(4 \cdot 4) = 4$ bits
 second beam selection: $\lceil \log_2(7) \rceil = 3$ bits
 beam relative power: 2 bits Although the codebook defines precoders as linear combinations of L=2 beams (or $N_{DP}$ beams using the notation in the description of multi-beam precoders above), it is possible to set the relative beam power of the second beam to zero, resulting in an effective precoder comprising only L=1 beam. In such a case, precoder components describing a second beam do not need to be known to construct the precoder and correspondingly, no signaling indicating said precoder components are needed.

Thus, the reporting of the $W_2$ matrix uses $(2L-1) N_p$ r bits per subband, where L is the number of beams, $N_p$ is the number of phase bits per element of $W_2$ (or $\log_2 K$ bits using the notation of the multibeam precoder discussion above), and r is the rank. Since a QPSK constellation is used, $N_p=2$ and the number of bits for $W_2$ per subband for L=1 and L=2 are summarized in Table 2:

TABLE 2

$W_2$ beam cophasing overhead (per subband)

| Rank | Beams (L) | |
|---|---|---|
| (r) | 1 | 2 |
| 1 | 2 bits | 6 bits |
| 2 | 4 bits | 12 bits |

Since it may be beneficial to report $W_2$ together with CQI in a PUCCH transmission, for PUCCH Format 2, the total payload can be no more than 11 bits. Because CQI occupies 4 and 7 bits for 1 and 2 codewords respectively, $W_2$ can occupy no more than 7 or 4 bits for rank 1 or 2 (as rank 1 uses 1 codeword while rank 2 uses 2 codewords in LTE). Therefore, wideband $W_2$ PMI for rank 1 can fit on PUCCH Format 2 without subsampling, whereas subsampling 12 bits to 4 bits is needed for rank 2, for L=2. This constitutes a substantial subsampling.

Given the above constraints, three different payload sizes (2, 4, or 6) may be used for $W_2$ on PUCCH Format 2. eNB must be aware of the number of beams and the rank used to compute $W_2$ if the payload size varies. Since in Rel-13, eNB determines the size of the CQI field based on the RI, that principle can be reused to determine the rank used to compute $W_2$. If the beam power field is encoded independently of $W_2$, then the number of beams used to determine $W_2$ could also be determined by eNB from the reported beam power field.

The table below shows the $W_2$ payload sizes.

TABLE 3

$W_2$ payload alternatives

| Alternative | $W_2$ + CQI payload |
|---|---|
| One or Two beams, ranks 1 & 2 | Rank 1: {2 or 6} + 4 bits = 6 or 10 bits<br>Rank 2: 4 + 7 bits = 11 bits |

The rich $W_2$ CSI feedback in LTE Rel-14 implements a scalar quantization of beam and polarization cophasing for each layer, where the $W_2$ matrix for rank 2 may be expressed as:

$$W_2 = \begin{bmatrix} 1 & 1 \\ c_{10} & c_{11} \\ c_{20} & c_{21} \\ c_{30} & c_{31} \end{bmatrix}$$

where each $c_{i,j} \in \{1, j, -1, -j\}$, i.e. each element may be independently chosen from a QPSK constellation. To further clarify, $c_{1j}$ denotes a relative phase of the first and second beam on a first polarization, $c_{2j}$ denotes a relative phase between the two polarizations of the first beam, and $c_{3j}$ denotes the relative phase of the first beam on the first polarization and the second beam on the second polarization. Since scalar quantization is used, $W_2$ may be parametrized using the D=6 dimensional vector $c=[c_{10}\ c_{20}\ c_{30}\ c_{11}\ c_{21}\ c_{31}]^T$ and may thus be considered to have six degrees of freedom, resulting in $S=AT_rY=4^6=4096$ possible states, represented by 12 bits. The $W_2$ codebook may thus be indexed with k=0, 1, ..., S-1.

One approach to subsampling the $W_2$ codebook is to merely subsample the index k so that only every $X^{th}$ index may be chosen and instead report the index $$\tilde{k} = 0, 1, \ldots, \frac{S}{X} - 1,$$

where $k = X \cdot \tilde{k}$. However, such a subsampling does not utilize the structure of the codebook and may provide low CSI granularity.

Another approach to subsampling the codebook is to lower the constellation alphabet size, so that for instance $c_{i,j} \in \{1, -1\}$ and a Binary Phase Shift Keying (BPSK) constellation is used. In our example, though, this would still require 6 bits of feedback overhead which overshoots the target of 4 bits for rank 2. Note that since the BPSK constellation points are comprised in the QPSK constellation, lowering the constellation alphabet size in such a manner constitutes a codebook subsampling since all the resulting precoders in the subsampled codebook are comprised in the non-subsampled codebook.

However, in order to further reduce the feedback overhead, a method of rich CSI $W_2$ codebook subsampling is presented herein. The method works by parametrizing the $W_2$ codebook using a smaller number of parameters M than the required D parameters to span the entire codebook. That is, the precoders in the subsampled $W_2$ may be generated from a size-M vector $\tilde{c}=[\tilde{c}_0 \ldots \tilde{c}_{M-1}]^T$ and a fixed mapping from $\tilde{c}$ to precoder matrix.

As an illustrative embodiment, consider M=1 so that $\tilde{c}=\tilde{c}_0$. The subsampled precoder codebook may then be generated as, for instance, $$\tilde{W}_2 = \begin{bmatrix} 1 & 1 \\ \tilde{c}_0 & -\tilde{c}_0 \\ -\tilde{c}_0 & \tilde{c}_0 \\ \tilde{c}_0 & -\tilde{c}_0 \end{bmatrix}$$

If $\tilde{c}_0 \in \{1, j, -1, -j\}$, there are thus $4^1=4$ possible $W_2$ matrices in the subsampled codebook. Note that all possible $\tilde{W}_2$ are comprised in the non-subsampled codebook, and $\tilde{W}_2$ thus constitutes a codebook subsampling and not a new, separate codebook. For this to hold true, it is required that each element $c_{i,j}$ of the precoder matrices in the subsampled codebook belongs to the same constellation as the non-subsampled codebook (e.g. QPSK $\{1, j, -1, -j\}$). As Phase Shift Keying (PSK) constellations are closed under multiplication, one may thus construct $c_{i,j}$ by multiplying an arbitrary number of PSK symbols. Thus, if the elements of $\tilde{c}$ are from the same constellation as the elements in the non-subsampled codebook, and the elements in $\tilde{W}_2$ are formed by multiplying elements of $\tilde{c}$ or other PSK symbols (note that "-1" is a PSK symbol), $\tilde{W}_2$ is ensured to be comprised in the non-subsampled codebook. Based on these rules for generating codebook subsamplings according to the method, $\tilde{W}_2$-matrices that give a good tradeoff between performance and feedback overhead may be designed.

In some embodiments, a codebook subsampling is generated utilizing two properties:

Phase offset between beams are (partly) due to differences in propagation delay and so may be similar on both polarizations The precoding on different layers are often chosen to be mutually orthogonal The first property suggests that the ratios $c_{1,j}/1$ and $c_{3,j}/c_{2,j}$ may be similar in certain propagation conditions. This can be utilized in subsampling design so that the precoding of a single layer may be expressed as:

$$\begin{bmatrix} 1 \\ c \\ \varphi \\ c\varphi \end{bmatrix}$$

where c is a beam cophasing coefficient and $\varphi$ is a polarization cophasing coefficient, which both are QPSK symbols. Thus, with this design, the ratios $$\frac{c_{1,j}}{1} = \frac{c_{3,j}}{c_{2,j}} = c,$$

fulfilling the first desired property.

To fulfill the second property, the second layer may be designed to be orthogonal to the first layer so that $\mathbb{C}^H\mathbb{C} = \sigma \cdot I$, where I is the identity matrix (a matrix of all zeroes except on the diagonal, which contains all ones), and a is a non-negative scalar. This may be achieved by copying the coefficients for the first layer but negating the entries corresponding to the second polarization as:

$$\widetilde{W}_2 = \begin{bmatrix} 1 & 1 \\ c & c \\ \varphi & -\varphi \\ c\varphi & -c\varphi \end{bmatrix}$$

Thus, with this subsampling design, both desired properties are fulfilled. Furthermore, the subsampled codebook is generated from $\tilde{c} = [c\ \varphi]^T$, i.e. using 2 parameters, where each element in $\tilde{c}$ belongs to a QPSK constellation. Thus, 2+2=4 bits are needed to indicate an element in the subsampled codebook, which meets the requirement on PUCCH feedback overhead for $W_2$.

In some embodiments, the property that layers are often chosen to be mutually orthogonal is not utilized in the subsampling design, as this puts an unnecessary restriction on the channel quantization for some propagation conditions. Instead, each layer is encoded independently. The previously mentioned first property is still utilized though, so that a separate beam cophasing coefficient and polarization coefficient is used, resulting in a matrix design:

$$\widetilde{W}_2 = \begin{bmatrix} 1 & 1 \\ c_0 & c_1 \\ \varphi_0 & \varphi_1 \\ c_0\varphi_0 & c_1\varphi_1 \end{bmatrix}$$

Thus, the subsampled codebook may be generated from 4 parameters $\tilde{c} = [c_0\ c_1\ \varphi_0\ \varphi_1]^T$ in this embodiment. To meet the requirement of a 4 bit $W_2$ report though, each parameter cannot be selected from a QPSK constellation, as this would require an 8 bit report. However, as the BPSK constellation points are comprised within the QPSK constellation, using a lower order constellation for the parameters will still ensure that the $\mathbb{C}$ constitutes a subsampled codebook. Thus, if each parameter is selected from a BPSK constellation, the subsampled codebook may be reported with 4 bits and the requirement is met.

A UE assumes L=2 is used for reporting $W_2$ if rank=1 and L=1 if rank=2. In this case, there is no subsampling required for either rank=1 or rank=2 $W_2$, since 6 bits and 4 bits can be carried with CQI for rank 1 and rank 2, respectively, as discussed above with respect to $W_2$ payload alternatives. For rank=1, the full resolution of $W_2$ is preserved, and the full size $W_2$ (6 bits in the case of the Rel-14 codebook) is reported. For rank=2, a single beam is used for $W_2$, which corresponds to the $W_2$ with the non-subsampled multi-beam codebook, and so requires 4 bits to signal $W_2$ using the Rel-14 codebook.

For PUCCH Format 2, the following design goals for consistency with Rel-13 operation are identified:
1. All CSI reporting types must fit into 11 bits
2. At most 3 transmissions are needed to report RI, CQI, PMI, and CRI.
   a. RI is carried in one transmission
   b. Wideband CQI with 4 or 7 bits can be used for 1 or 2 codeword transmission, respectively, and is carried in another PUCCH transmission.
   c. At least the beam index is carried in a third PUCCH transmission.
3. Each transmission should be as useful as possible to the eNodeB in the absence of the other transmissions.

Since the RI often needs to be decoded to determine the size of other CSI fields, such as the CQI and the PMI, it is important that it be received reliably. Consequently, the RI should be multiplexed in a PUCCH transmission with as few as possible other fields, while still providing the needed CSI. Transmitting as little extra information as possible means that fewer bits are present in the PUCCH carrying the RI, and so it is received more reliably at a given received SINR.

The beam power indication and the second beam index require 2 and 3 bits, respectively. On the other hand, the first beam index requires at least 4 bits (8 bits if the index includes the rotation, as is done in the Rel-14 codebook agreement). Since the first beam index should be reported together with (or directly include) the beam rotation, these 8 bits should be reported in one PUCCH transmission. Overall, then, the beam power indication and the second beam index are reasonable candidates to multiplex with RI, whereas the first beam index and/or beam rotation are not.

If RI is multiplexed with the second beam index, then if Rel-13 PUCCH reporting timing is used, since RI (for example PUCCH reporting type 3 or 7), is likely to be reported more slowly than wideband PMI (i.e. PUCCH reporting type 2a), the two beams would be reported at different rates, which is undesirable, since they have the same basic characteristics and vary with propagation at the same rate in time. This unequal reporting rate will also likely degrade performance. Therefore, it does not seem desirable to report the second beam index with RI.

Reporting the beam power indication with RI makes intuitive sense, since the number of beams in the channel is similar to its rank, as the number of beams identifies the number of parameters needed to approximate the channel just as the rank does. Furthermore, the beam power indication identifies if precoder parameters for the second beam need to be known, and so can be considered a beam count indicator.

The beam power field (also 'beam count indicator') can be used to identify the size of the $W_2$ cophasing indicator and the presence of information identifying the second beam. If the beam power field corresponding to the $2^{nd}$ beam indicates a non-zero value (for example, 1, $\sqrt{0.5}$, or $\sqrt{0.25}$), then the CSI report corresponds to 2 beams. In this case, the second beam index is reported, and the size of a wideband cophasing indicator $W_2$ reported on PUCCH will be 4 bits (with $W_2$ subsampling as discussed above). If the beam power field indicates a zero value, then the second beam index is not reported, and the size of a wideband cophasing indicator $W_2$ reported on PUCCH will be 2 or 4 bits (also as discussed above with respect to $W_2$ beam cophasing overhead per subband), depending on if rank 1 or rank 2, respectively, is indicated by RI.

Therefore, in an embodiment, a rank indicator and a beam count indicator are both transmitted in one transmission. The rank indicator identifies the rank used when computing the CSI feedback to which the rank relates. The beam count indicator identifies at least the number of beams used when computing the CSI feedback, and may additionally indicate the relative power of beams identified in the CSI feedback. The rank and beam count indicators may identify the size of a CSI feedback field transmitted in a separate transmission, such as a cophasing indicator ($W_2$) or a beam index ($W_1$). With this embodiment, the advanced CSI feedback can be carried on PUCCH Format 2 over at least three transmissions, i.e.

1. 1st transmission: RI+ beam power (or beam count indicator)
2. 2nd transmission: $W_1$ (first beam index+beam rotation+ second beam index)
3. 3rd transmission: $W_2$ and CQI Note that while the transmissions may be sequenced in time in the order of their numbering, this is not required. Also, these may be sent as completely separate transmissions or as separate parts of the same transmission.

In a related embodiment, a later transmission carries a CQI field and a cophasing indicator field ($W_2$). The size of the cophasing indicator field is determined by at least a beam count indicator transmitted in an earlier transmission, and the size of the CQI field is determined by at least an RI transmitted in the earlier transmission.

It may also be desirable to provide an alternative indication of the number of beams used in the multi-beam CSI report. This can allow the number of beams to be reported to eNB more often than when the number of beams is only provided in reports containing RI, since RI is generally reported infrequently. In this case, a CSI report for the second (weaker) beam jointly identifies the number of beams and an index of the second beam. The particular codebook design used in 3GPP is well suited to this, since the second beam index has 7 possible values, and so an 8th value indicating if the second beam is present can fit in a 3 bit indicator.

Therefore, in an embodiment, a first transmission carries a beam index that is jointly encoded with an indication of if a second beam is not present where when the second beam is not present corresponds to a beam power of 0 for the second beam. Additionally, a second transmission may carry a cophasing indicator field. The size of the cophasing indicator field is determined by at least the indication of if a second beam is not present.

Figure 14:
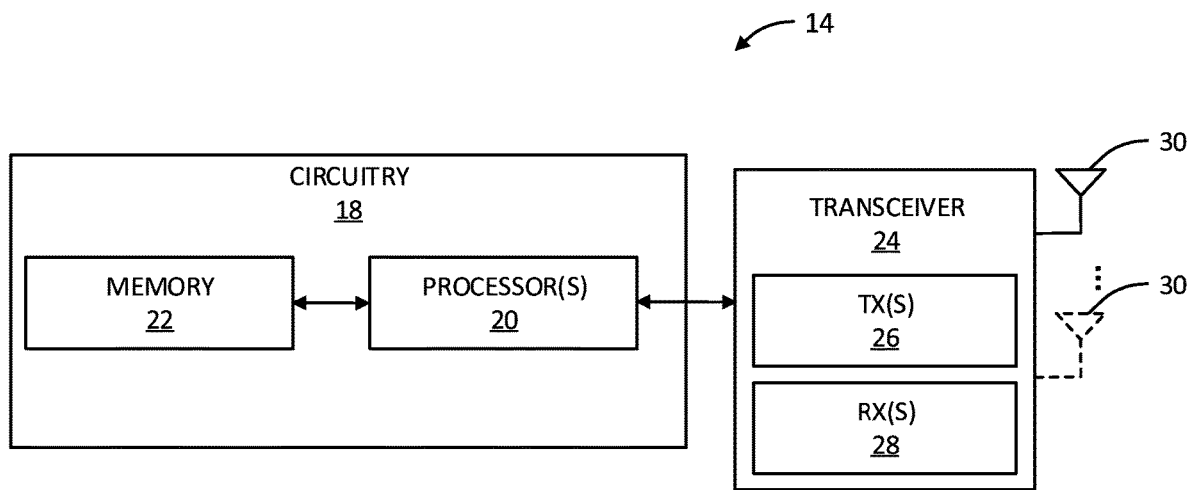
FIGS. 14 and 15 illustrate example embodiments of a wireless device according to some embodiments of the present disclosure.
Figure 15:
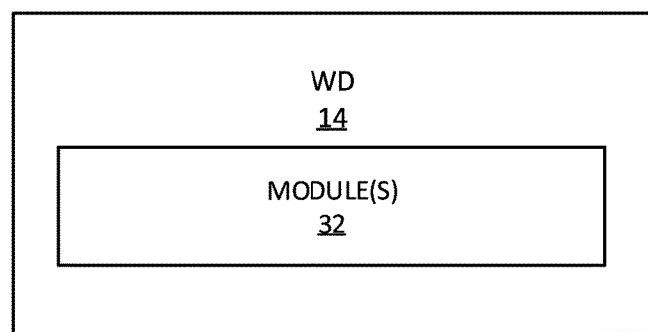

FIGS. 14 and 15 illustrate example embodiments of a second node 14 such as a wireless device 14 according to some embodiments of the present disclosure. FIG. 14 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 15 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE 14) described herein.

Figure 16:
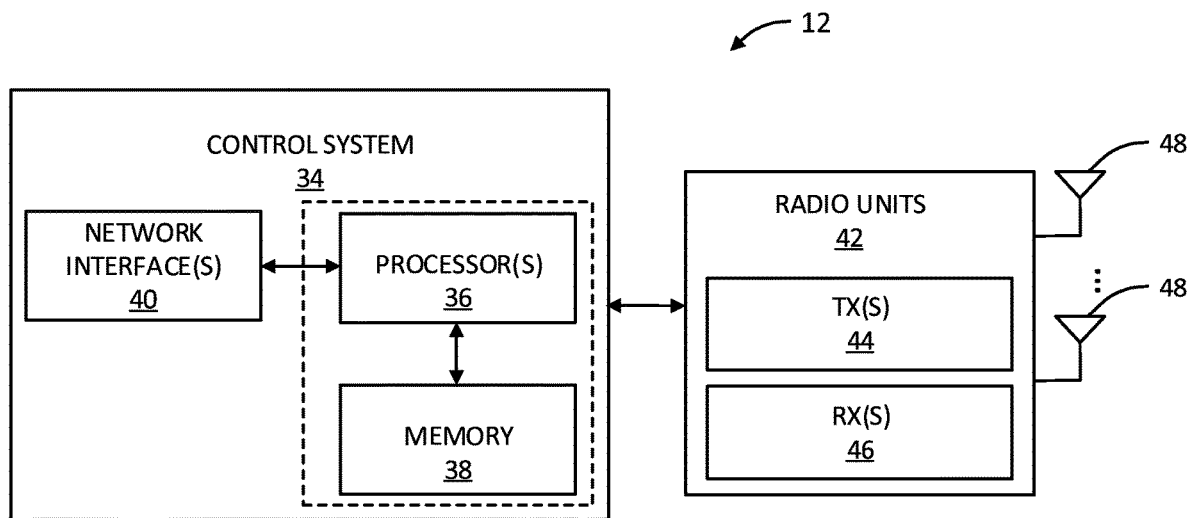
FIGS. 16 through 18 illustrate example embodiments of a radio network node according to some embodiments of the present disclosure.
Figure 18:
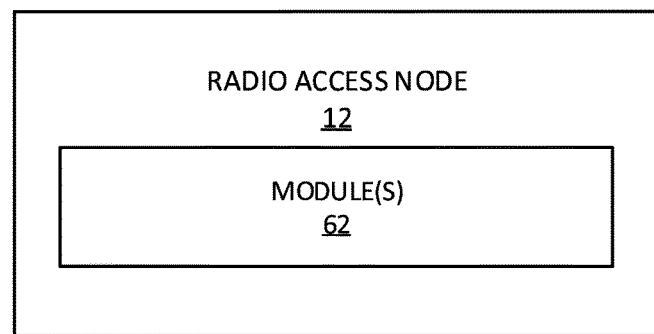
Figure 17:
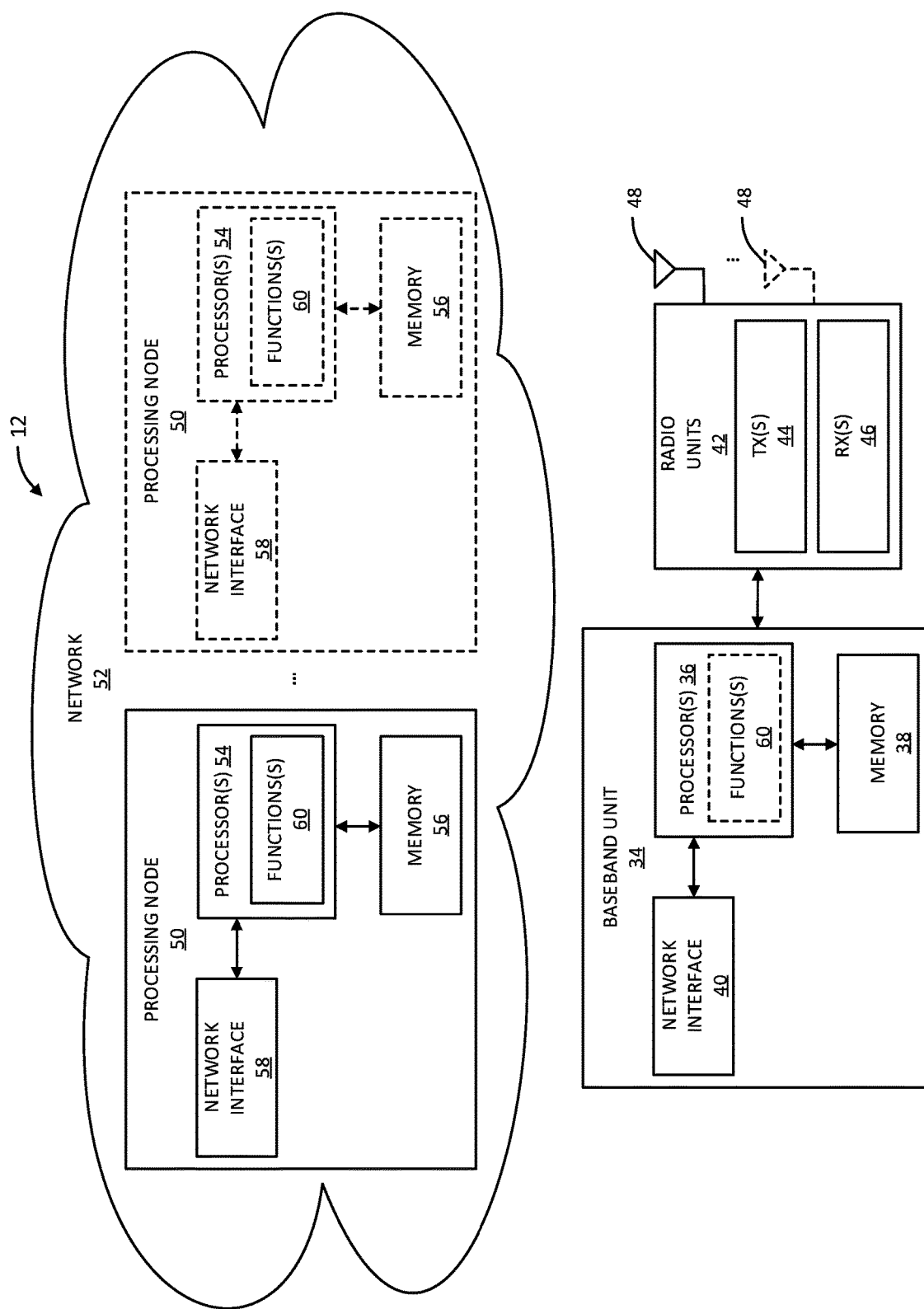

FIGS. 16 through 18 illustrate example embodiments of a radio network node according to some embodiments of the present disclosure.

FIG. 16 is a schematic block diagram of the node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 17 is a schematic block diagram that illustrates a virtualized embodiment of the radio access node 12 according to some embodiments of the present disclosure. Other types of network nodes may have similar architectures (particularly with respect to including processor(s), memory, and a network interface).

As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 16. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 18 is a schematic block diagram of the radio access node 12 according to some other embodiments of the present disclosure. The radio access node 12 includes one or more modules 62, each of which is implemented in software. The module(s) 62 provide the functionality of the radio access node 12 described herein.

EXAMPLE EMBODIMENTS

While not being limited thereto, some example embodiments of the present disclosure are provided below.

1. A method of operation of a second node (14) connected to a first node (12, 50) in a wireless communication network, comprising:
    reporting (100A) rich CSI feedback to the first node (12, 50) on a physical channel with a small payload.
2. The method of embodiment 1 wherein reporting the rich CSI feedback comprises:
    identifying (200A) a subset of codebook entries from a codebook of coefficients;
    selecting (202A) a codebook entry from the subset; and
    reporting (204A) an index of the selected codebook entry.
3. The method of embodiment 2 wherein:
    each entry of the codebook is identified by an index k
    the entry of the codebook with index k comprises a vector or matrix $C_k$ of complex numbers with L' rows and r columns, L' and r being positive integers;
    each of (L'−1)r elements of each entry comprise a scalar complex number that can be one of N complex numbers;
    $\|C_{k_1} - C_{k_2}\|_F > 0$ where $k_1 \cdot k_2$ are indices of different codebook entries, and $\|C\|_F$ is the Frobenius norm of a matrix or vector C;
    the codebook comprises $N^{(L'-1)r}$ entries; and
    the subset comprises one of $K^M$ entries, where K≤N and M<(L'−1)r are positive integers and each entry in the subset is identified by an index.
4. The method of embodiment 3 wherein the selected codebook entry for when r=2 can be constructed from M=2 distinct variables and each variable can be one of K=N complex numbers and $C_k^H C_k = I$ for each entry $C_k$ in the subset.
5. The method of embodiment 2 wherein:
    each entry of the codebook comprises a vector or matrix;
    one or more elements of each entry comprise a scalar complex number;
    a norm between the matrix or vector difference between any two different codebook entries is greater than zero.
6. The method of any one of embodiments 1 to 4 wherein the selected codebook entry for when r=2 can be constructed from M=4 distinct variables and each variable can be one of $K=\sqrt{N}$ complex numbers and $C_k^H C_k \neq I$ for at least one entry $C_k$ in the subset.
7. A method of operation of a second node (14) connected to a first node (12, 50) in a wireless communication network for reporting multi-beam CSI, comprising:
    reporting (300A) a rank indicator and a beam count indicator in a first transmission on an uplink control channel; and
    reporting (302A) a cophasing indicator in a second transmission on the uplink control channel, the cophasing indicator identifying a selected entry of a codebook of cophasing coefficients wherein the number of bits in the cophasing indicator is identified by at least one of the beam count indicator and the rank indicator.
8. The method of embodiment 7 wherein the beam count indicator comprises at least one of a number of beams and an indication of relative powers, the possible values of the indication comprising both a zero and a non-zero value.
9. A method of operation of a second node (14) connected to a first node in a wireless communication network for reporting CSI, comprising:
    jointly identifying the number of beams and an index of a beam in a multi-beam CSI report; and
    transmitting the multi-beam CSI report to the first node (12, 50).
10. The method of embodiment 9 wherein jointly identifying the number of beams and the index of the beam in the multi-beam CSI report comprises:
    determining (304A) a number of beams L used to construct the multi-beam CSI report; and
    determining (306A) a beam indicator for an $l^{th}$ beam, the beam indicator identifying the index of a beam of the multi-beam CSI report if L is at least 1, and otherwise identifying that L is less than 1.
11. A method of operation of a second node (14) connected to a first node (12, 50) in a wireless communication network, comprising:
    reporting (400A) CSI corresponding to a first number of beams if the CSI corresponds to a first rank; and
    reporting (402A) CSI corresponding to a second number of beams if the CSI corresponds to a second rank 12. The method of embodiment 11 wherein:
    the first rank is smaller than the second rank; and
    the first number of beams is larger than the second number of beams.
13. The method of any one of embodiments 1 to 12 further comprising:
    providing an indication of at least one beam index pair index $(l_k, m_k)$ in uplink control information, UCI, each beam index pair corresponding to a beam k.
14. The method of any one of embodiments 1 to 13 wherein:
    each beam is a $k^{th}$ beam d(k) that comprises a set of complex numbers and has index pair $(l_k, m_k)$, each element of the set of complex numbers being characterized by at least one complex phase shift such that:

$$d_n(k) = d_i(k)\alpha_{i,n} e^{j2\pi(p\Delta_{1,k} + q\Delta_{2,k})},$$

$d_n(k)$, and $d_i(k)$ are the $i^{th}$ and $n^{th}$ elements of the beam d(k), respectively,
    $\alpha_{i,n}$ is a real number corresponding to the $i^{th}$ and $n^{th}$ elements of the beam d(k)
    p and q are integers, and
    beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively
15. The method of any one of embodiments 1 to 14 wherein the first node (12, 50) is a radio access node (12).
16. The method of any one of embodiments 1 to 15 wherein the second node (14) is a wireless device (14).
17. A second node (14) adapted to operate according to the method of any one of embodiments 1 to 16.
18. A second node (14), comprising:
    at least one processor (20);
    memory (22) comprising instructions executable by the at least one processor (20) whereby the second node (14) is operable to:
    report rich CSI feedback to the first node (12, 50) on a physical channel with a small payload.
19. A second node (14), comprising:
    a reporting module (32) operable to report rich CSI feedback to the first node (12, 50) on a physical channel with a small payload.
20. A method of operation of a first node (12) in a wireless communication network, comprising:
    receiving (100B) rich CSI feedback from a second node (14) on a physical channel with a small payload.
21. The method of embodiment 20 wherein reporting the rich CSI feedback comprises:
    a subset of codebook being selected (200B) entries from a codebook of coefficients;
    a codebook entry being selected (202B) from the subset; and
    receiving (204B) an index of the selected codebook entry.
22. The method of embodiment 21 wherein:
    each entry of the codebook is identified by an index k
    the entry of the codebook with index k comprises a vector or matrix $C_k$ of complex numbers with L' rows and r columns, L' and r being positive integers;
    each of (L'−1)r elements of each entry comprise a scalar complex number that can be one of N complex numbers;
    $\|C_{k_1} - C_{k_2}\|_F > 0$ where $k_1 \cdot k_2$ are indices of different codebook entries, and $\|C\|_F$ is the Frobenius norm of a matrix or vector C;
    the codebook comprises $N^{(L'-1)r}$ entries; and
    the subset comprises one of $K^M$ entries, where K≤N and M<(L'−1)r are positive integers and each entry in the subset is identified by an index.
23. The method of embodiment 22 wherein the selected codebook entry for when r=2 can be constructed from M=2 distinct variables and each variable can be one of K=N complex numbers and $C_k^H C_k = I$ for each entry $C_k$ in the subset.
24. The method of embodiment 21 wherein:
    each entry of the codebook comprises a vector or matrix;
    one or more elements of each entry comprise a scalar complex number;
    a norm between the matrix or vector difference between any two different codebook entries is greater than zero.
25. The method of any one of embodiments 20 to 23 wherein the selected codebook entry for when r=2 can be constructed from M=4 distinct variables and each variable can be one of K=√N complex numbers and $C_k^H C_k \ne I$ for at least one entry $C_k$ in the subset.
26. A method of operation of a first node (12) in a wireless communication network for reporting multi-beam CSI, comprising:
    receiving (300B) a rank indicator and a beam count indicator in a first transmission on an uplink control channel; and
    receiving (302B) a cophasing indicator in a second transmission on the uplink control channel, the cophasing indicator identifying a selected entry of a codebook of cophasing coefficients wherein the number of bits in the cophasing indicator is identified by at least one of the beam count indicator and the rank indicator.
27. The method of embodiment 26 wherein the beam count indicator comprises at least one of a number of beams and an indication of relative powers, the possible values of the indication comprising both a zero and a non-zero value.
28. A method of operation of a first node (12) connected to a first node in a wireless communication network for reporting CSI, comprising:
    jointly identifying the number of beams and an index of a beam in a multi-beam CSI report; and
    receiving the multi-beam CSI report from the second node (14).
29. The method of embodiment 28 wherein jointly identifying the number of beams and the index of the beam in the multi-beam CSI report comprises:
    determining (304A) a number of beams L used to construct the multi-beam CSI report; and
    determining (306A) a beam indicator for an $l^{th}$ beam, the beam indicator identifying the index of a beam of the multi-beam CSI report if L is at least l, and otherwise identifying that L is less than l.
30. A method of operation of a first node (12) in a wireless communication network, comprising:
    receiving (400B) CSI corresponding to a first number of beams if the CSI corresponds to a first rank; and
    receiving (402B) CSI corresponding to a second number of beams if the CSI corresponds to a second rank
31. The method of embodiment 30 wherein:
    the first rank is smaller than the second rank; and
    the first number of beams is larger than the second number of beams.
32. The method of any one of embodiments 20 to 31 further comprising:
    receiving an indication of at least one beam index pair index $(l_k, m_k)$ in uplink control information, UCI, each beam index pair corresponding to a beam k.
33. The method of any one of embodiments 20 to 32 wherein:
    each beam is a $k^{th}$ beam d(k) that comprises a set of complex numbers and has index pair $(l_k, m_k)$, each element of the set of complex numbers being characterized by at least one complex phase shift such that:

$$d_n(k)=d_i(k)a_{i,n}e^{j2\pi(p\Delta_{1,k}+q\Delta_{2,k})},$$

$d_n(k)$, and $d_i(k)$ are the $i^{th}$ and $n^{th}$ elements of the beam d(k), respectively, $a_{i,n}$ is a real number corresponding to the $i^{th}$ and $n^{th}$ elements of the beam d(k)

p and q are integers, and beam directions $\Delta_{1,k}$ and $\Delta_{2,k}$ are real numbers corresponding to beams with index pair $(l_k,m_k)$ that determine the complex phase shifts $e^{j2\pi\Delta_{1,k}}$ and $e^{j2\pi\Delta_{2,k}}$ respectively 34. The method of any one of embodiments 20 to 33 wherein the first node (12, 50) is a radio access node (12).
35. The method of any one of embodiments 20 to 34 wherein the second node (14) is a wireless device (14).
36. A first node (12) adapted to operate according to the method of any one of embodiments 20 to 35.
37. A first node (12, 50), comprising:
   at least one processor (36);
   memory (38) comprising instructions executable by the at least one processor (36) whereby the first node (12, 50) is operable to:
   receive rich CSI feedback from the second node (14) on a physical channel with a small payload.
38. A first node (12, 50), comprising:
   a receiving module (62) operable to receive rich CSI feedback to the first node (12, 50) on a physical channel with a small payload.

The following acronyms are used throughout this disclosure.

1D One-Dimension
2D Two-Dimension
3GPP Third Generation Partnership Project
5G Fifth Generation
ACK Acknowledgement
ARQ Automatic Repeat-Request
ASIC Application Specific Integrated Circuit
BPSK Binary Phase-Shift Keying
CE Control Element
CPU Central Processing Unit
CQI Channel Quality Indicator
CRI CSI-RS Resource Indication
CSI Channel State Information
DCI Downlink Control Information
DFT Discrete Fourier Transform
DL-SCH Downlink Shared Channel
eNodeB Enhanced or Evolved Node B
EPDCCH Enhanced PDCCH
FDD Frequency Division Duplex
FD-MIMO Full Dimension MIMO
FPGA Field Programmable Gate Array
GSM Global System for Mobile Communications
HARQ Hybrid Automatic Repeat Request
LTE Long Term Evolution
MAC Medium Access Control
MCS Modulation And Coding State
MIMO Multiple-Input Multiple-Output
ms millisecond
MU-MIMO Multi-User MIMO
NACK Negative Acknowledgement
NR New Radio
NZP Non-Zero Power
OFDM Orthogonal Frequency-Division Multiplexing
PDCCH Physical Downlink Control Channel
PMI Precoder Matrix Indicator
PRB Physical Resource Block
PUCCH Physical Uplink Control Channel
PUSCH Physical Uplink Shared Channel
QPSK Quadrature Phase-Shift Keying
RI Rank Indicator
RRC Radio Resource Control
RSRP Reference Signal Received Power
RSRQ Reference Signal Received Quality
RSSI Received Signal Strength Indicator
SINR Signal-to-Interference-and-Noise Ratio
SR Scheduling Request
SRB Signaling Radio Bearers
TDD Time-Division Duplex
TFRE Time/Frequency Resource Element
TS Technical Specification
UCI Uplink Control Information
UE User Equipment
ULA Uniform Linear Array
UL-SCH Uplink Shared Channel
UMB Ultra Mobile Broadband
UPA Uniform Planar Array
WCDMA Wideband Code-Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method of operation of a second node connected to a first node in a wireless communication network for reporting multi-beam Channel State Information, CSI, comprising:
   reporting at least one of: a rank indicator and a beam count indicator in a first transmission to the first node;
   reporting a cophasing indicator in a second transmission to the first node, the cophasing indicator identifying a selected entry of a codebook of cophasing coefficients;
   reporting a beam index in a third transmission to the first node;
   wherein the beam count indicator comprises at least one of the group consisting of: a number of beams and an indication of relative powers.

2. The method of claim 1 wherein:
   reporting the rank indicator and the beam count indicator in the first transmission comprises reporting the rank indicator and the beam count indicator in the first transmission on an uplink control channel; and
   reporting the cophasing indicator in the second transmission comprises reporting the cophasing indicator in the second transmission on the uplink control channel.

3. The method of claim 1 wherein the beam count indicator comprises the indication of relative powers.

4. The method of claim 1 wherein possible values of at least one of the beam count indicator, and the cophasing indicator comprise both a zero and a non-zero value.

5. The method of claim 1 wherein a number of bits in the cophasing indicator is identified by at least one of the beam count indicator and the rank indicator.

6. The method of claim 5, wherein reporting a beam index further comprising:
   providing an indication of at least one beam index pair index $(l_k, m_k)$ corresponding to a beam d(k).

7. The method of claim 1 wherein the third transmission also comprises at least one of the group consisting of a beam rotation and second beam index.

8. The method of claim 1 further comprising:
jointly identifying the number of beams and indices of the beams in a multi-beam CSI report; and
the first transmission, the second transmission, and the third transmission comprise transmitting the multi-beam CSI report to the first node.

9. The method of claim 8 wherein jointly identifying the number of beams and the indices of the beams in the multi-beam CSI report comprises:
determining a number of beams L used to construct the multi-beam CSI report; and
determining a beam indicator for an $l^{th}$ beam, the beam indicator identifying the index of the $l^{th}$ beam of the multi-beam CSI report if L is at least l, and otherwise identifying that L is less than l.

10. The method of claim 1 further comprising:
reporting CSI corresponding to a first number of beams if the CSI corresponds to a first rank; and
reporting CSI corresponding to a second number of beams if the CSI corresponds to a second rank.

11. The method of claim 10 wherein:
the first rank is smaller than the second rank; and
the first number of beams is larger than the second number of beams.

12. The method of claim 1 wherein:
each beam d(k) comprises a set of complex numbers and, each element of the set of complex numbers is characterized by at least one complex phase shift such that:

$$d_n(k)=d_i(k)\alpha_{i,n}e^{j2\pi(p\Delta_{1,k}+q\Delta_{2,k})},$$

$d_n(k)$, and $d_i(k)$ are the $n^{th}$ and $i^{th}$ elements of the beam d(k), respectively,
$a_{i,n}$ is a real number corresponding to the $i^{th}$ and $n^{th}$ elements of the beam d(k)
p and q are integers, and
$\Delta_{1,k}$ and $\Delta_{2,k}$ are real numbers corresponding to a two-dimensional beam with index pair ($l_k$, $m_k$) that determine the complex phase shifts $e^{j2\pi\Delta_{1,k}}$ and $e^{j2\pi\Delta_{2,k}}$ in each dimension, respectively.

13. The method of claim 1 wherein the first node is a radio access node.

14. The method of claim 1 wherein the second node is a wireless device.

15. The method of claim 1 wherein the wireless communication network is a Long Term Evolution, LTE, wireless communication network.

16. A method of operation of a first node connected to a second node in a wireless communication network for receiving multi-beam Channel State Information, CSI, comprising:
receiving at least one of: a rank indicator and a beam count indicator in a first transmission from the second node;
receiving a cophasing indicator in a second transmission from the second node, the cophasing indicator identifying a selected entry of a codebook of cophasing coefficients; and
receiving a beam index in a third transmission from the second node;
wherein the beam count indicator comprises at least one of the group consisting of: a number of beams and an indication of relative powers.

17. The method of claim 16 wherein:
receiving the rank indicator and the beam count indicator in the first transmission comprises receiving the rank indicator and the beam count indicator in the first transmission on an uplink control channel; and
receiving the cophasing indicator in the second transmission comprises receiving the cophasing indicator in the second transmission on the uplink control channel.

18. The method of claim 16 wherein the beam count indicator comprises the indication of relative powers.

19. The method of claim 16 wherein possible values of at least one of the beam count indicator, and the cophasing indicator comprise both a zero and a non-zero value.

20. The method of claim 16 wherein a number of bits in the cophasing indicator is identified by at least one of the beam count indicator and the rank indicator.

21. The method of claim 20 further comprising:
receiving an indication of at least one beam index pair index ($l_k$, $m_k$) corresponding to a beam k.

22. The method of claim 16 wherein the third transmission also comprises at least one of the group consisting of a beam rotation and second beam index.

23. The method of claim 16 further comprising:
receiving CSI corresponding to a first number of beams if the CSI corresponds to a first rank; and
receiving CSI corresponding to a second number of beams if the CSI corresponds to a second rank.

24. The method of claim 23 wherein:
the first rank is smaller than the second rank; and
the first number of beams is larger than the second number of beams.

25. The method of claim 16 wherein:
each beam d(k) comprises a set of complex numbers and, each element of the set of complex numbers is characterized by at least one complex phase shift such that:

$$d_n(k)=d_i(k)\alpha_{i,n}e^{j2\pi(p\Delta_{1,k}+q\Delta_{2,k})},$$

$d_n(k)$, and $d_i(k)$ are the $n^{th}$ and $i^{th}$ elements of the beam d(k), respectively,
$a_{i,n}$ is a real number corresponding to the $i^{th}$ and $n^{th}$ elements of the beam d(k)
p and q are integers, and
$\Delta_{1,k}$ and $\Delta_{2,k}$ are real numbers corresponding to a two-dimensional beam with index pair ($l_k$, $m_k$) that determine the complex phase shifts $e^{j2\pi\Delta_{1,k}}$ and $e^{j2\pi\Delta_{2,k}}$ in each dimension, respectively.

26. The method of claim 16 wherein the first node is a radio access node.

27. The method of claim 16 wherein the second node is a wireless device.

28. The method of claim 16 wherein the wireless communication network is a Long Term Evolution, LTE, wireless communication network.

* * * * *